US012786771B2

(12) United States Patent
Guo et al.

(10) Patent No.: US 12,786,771 B2
(45) Date of Patent: Nov. 3, 2026

(54) TRANSMISSION DELAY MEASUREMENT METHOD, POSITIONING METHOD, TERMINAL, BASE STATION AND STORAGE MEDIUM

(71) Applicant: ZTE CORPORATION, Shenzhen (CN)

(72) Inventors: Xiaojiang Guo, Shenzhen (CN); Jie Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 413 days.

(21) Appl. No.: 18/565,803

(22) PCT Filed: May 17, 2022

(86) PCT No.: PCT/CN2022/093299

§ 371 (c)(1),
(2) Date: Nov. 30, 2023

(87) PCT Pub. No.: WO2022/252979

PCT Pub. Date: Dec. 8, 2022

(65) Prior Publication Data

US 2024/0373272 A1 Nov. 7, 2024

(30) Foreign Application Priority Data

Jun. 1, 2021 (CN) ......................... 202110607662.5

(51) Int. Cl.
*H04W 24/10* (2009.01)
*G01S 13/76* (2006.01)
*H04B 17/318* (2015.01)

(52) U.S. Cl.
CPC ........... *H04W 24/10* (2013.01); *G01S 13/765* (2013.01); *H04B 17/328* (2023.05)

(58) Field of Classification Search
None
See application file for complete search history.

(56) References Cited

U.S. PATENT DOCUMENTS 8,670,431 B2 * 3/2014 Ofuji ..................... H04L 5/0051 370/344
9,763,034 B2 9/2017 Denis et al.
(Continued)

FOREIGN PATENT DOCUMENTS

CN 101472334 A 7/2009
CN 101790188 A 7/2010
(Continued)

OTHER PUBLICATIONS

Huawei et al. “Enhancement to support multi-path and NLOS mitigation,” 3GPP TSG RAN WG1 #105-e, May 10-27, 2021, R1-2104281.*
(Continued)

*Primary Examiner* — Andrew C Oh
(74) *Attorney, Agent, or Firm* — Vivacqua Crane, PLLC

(57) ABSTRACT

A transmission delay measurement method, a positioning method, a terminal, a base station and a storage medium are disclosed. The method may include acquiring a downlink reference signal sent by a base station, and determining a LOS path and a reference path from a plurality of transmission paths of the downlink reference signal; acquiring a reference delay difference that is a difference between a downlink transmission delay of the LOS path and the downlink transmission delay of reference path; sending an uplink reference signal to the base station, to cause the base station to obtain an uplink transmission delay of reference path based on the uplink reference signal; and reporting the reference delay difference to the base station, to cause the base station to obtain the uplink transmission delay of LOS path based on the uplink transmission delay of reference path and reference delay difference.

17 Claims, 15 Drawing Sheets

(56) References Cited

U.S. PATENT DOCUMENTS

| | | | | |
|---|---|---|---|---|
| 2008/0130794 | A1 | 6/2008 | Chong et al. | |
| 2019/0116605 | A1* | 4/2019 | Luo | H04B 7/06952 |
| 2019/0271775 | A1 | 9/2019 | Zhang et al. | |
| 2019/0320471 | A1 | 10/2019 | Ohara et al. | |
| 2020/0228272 | A1 | 7/2020 | Soriaga et al. | |
| 2020/0389908 | A1* | 12/2020 | Shabbo | H04B 7/0456 |
| 2021/0051585 | A1 | 2/2021 | Kim et al. | |
| 2021/0051668 | A1* | 2/2021 | Yu | H04B 7/0626 |
| 2022/0113364 | A1* | 4/2022 | Zhou | G01S 5/0218 |
| 2023/0262632 | A1* | 8/2023 | Liu | H04W 56/0045 370/503 |

FOREIGN PATENT DOCUMENTS

| | | | | | |
|---|---|---|---|---|---|
| CN | 102387526 | A | | 3/2012 | |
| CN | 104662436 | A | | 5/2015 | |
| CN | 102315866 | B | * | 7/2015 | H04B 17/12 |
| CN | 104662436 | B | | 3/2018 | |
| CN | 110944382 | A | | 3/2020 | |
| CN | 111257901 | A | | 6/2020 | |
| CN | 112034419 | A | | 12/2020 | |
| EP | 2763470 | A1 | * | 8/2014 | H04W 72/20 |
| EP | 3726896 | A1 | | 10/2020 | |
| JP | 2010512072 | A | | 4/2010 | |
| JP | 2014534425 | A | | 12/2014 | |
| JP | WO2018128064 | A1 | | 11/2019 | |
| JP | 2020005128 | A | | 1/2020 | |
| KR | 101578257 | B1 | * | 12/2015 | H04W 72/542 |
| WO | WO-2013025144 | A1 | * | 2/2013 | H04W 52/244 |
| WO | WO-2016003168 | A1 | * | 1/2016 | H04W 4/80 |
| WO | 2019086309 | A1 | | 5/2019 | |
| WO | WO-2020061844 | A1 | * | 4/2020 | H04W 72/23 |
| WO | WO-2020146838 | A1 | * | 7/2020 | H04W 64/003 |
| WO | WO-2021104680 | A1 | * | 6/2021 | H04B 7/0617 |
| WO | WO-2021133374 | A1 | * | 7/2021 | H04B 17/328 |
| WO | WO-2021228394 | A1 | * | 11/2021 | H04L 5/0051 |

OTHER PUBLICATIONS

3GPP Technical Specification Group Radio Access Network. "Enhancement to support multi-path and NLOS mitigation," R1-2104281, 3GPP TSG RAN WG1 Meeting #105-e, May 2021, pp. 1-8.

European Patent Office. Extended European Search Report for EP Application No. 22815026.4, mailed Oct. 9, 2024, pp. 1-10.

Japan Patent Office. Notice of Reasons for Refusal for JP Application No. 2023-574509 and English translation, mailed Oct. 8, 2024, pp. 1-4.

International Searching Authority. International Search Report and Written Opinion for PCT Application No. PCT/CN2022/093299 and English translation, mailed Aug. 23, 2022, pp. 1-10.

Intellectual Property India. Examination Report for IN Application No. 202317085835 and English translation, mailed Apr. 17, 2026, pp. 1-7.

The State Intellectual Property Office of People's Republic of China. First Office Action and Search Report for CN Application No. 202110607662.5 and English translation, mailed Mar. 6, 2026, pp. 1-16.

* cited by examiner

TRANSMISSION DELAY MEASUREMENT METHOD, POSITIONING METHOD, TERMINAL, BASE STATION AND STORAGE MEDIUM

CROSS-REFERENCE TO RELATED APPLICATION

This application is a national stage filing under 35 U.S.C. § 371 of international application number PCT/CN2022/093299, filed May 17, 2022, which claims priority to Chinese patent application No. 202110607662.5 filed Jun. 1, 2021. The contents of these applications are incorporated herein by reference in their entireties.

TECHNICAL FIELD

The present disclosure relates to, but is not limited to, the field of wireless communication, and in particular to a method for measuring transmission delay, a method for positioning, a terminal device, a base station, and a storage medium.

BACKGROUND

With the development of communication technology, the positioning function has become an indispensable function of communication equipment. Ranging is a key link in the positioning function, which is typically achieved by measuring the transmission delay between a transmitter and a receiver. Due to inefficiencies of the current commercial base stations and terminal devices in maintaining a high degree of consistency in time reference, the International Organization for Standardization puts forward Round Trip Time (RTT) measurement in relevant standards.

Line of Sight (LOS) path is a transmission path with no reflection of the transmission signals, so the transmission delay of the LOS path constitutes key information for RTT measurement. However, under the condition that the transmission power of a terminal device is not strong, the reference signal transmitted through the LOS path is prone to submergence by sidelobes, noise, or interference of the non-light-of-sight (NLOS) path.

In order to address this issue, typically the terminal device would consecutively transmit multiple uplink reference signals to improve the signal noise ratio (SNR) of the signals to be received by the base station, so as to detect the LOS path and measure the uplink transmission delay of the LOS path. However, when the SNR of the uplink reference signal transmitted by the terminal device is low, more uplink reference signals need to be transmitted, resulting in greater resource overhead.

SUMMARY

The following is a summary of the subject matter described herein. This summary is not intended to limit the scope of protection of the claims.

Provided are a method for measuring transmission delay, a method for positioning, a terminal device, a base station, and a storage medium, which can achieve the measurement of the uplink transmission delay of a LOS path with less resource overhead under the condition of low transmission power of the terminal device.

An embodiment of the present disclosure provides a method for measuring transmission delay, which is applied to a terminal device. The method may include, acquiring a downlink reference signal sent by a base station, and determining a line of sight (LOS) path and a reference path from a plurality of transmission paths of the downlink reference signal; acquiring a reference delay difference that is a difference between a downlink transmission delay of the LOS path and the downlink transmission delay of the reference path; sending an uplink reference signal to the base station, to cause the base station to obtain an uplink transmission delay of the reference path based on the uplink reference signal; and reporting the reference delay difference to the base station, to cause the base station to obtain the uplink transmission delay of the LOS path based on the uplink transmission delay of the reference path and the reference delay difference.

An embodiment of the present disclosure provides a method for measuring transmission delay, which is applied to a base station. The method may include, sending a downlink reference signal to a terminal device, to cause the terminal device to determine a line of sight (LOS) path and a reference path from a plurality of transmission paths of the downlink reference signal; acquiring an uplink reference signal sent by the terminal device, and acquiring an uplink transmission delay of the reference path based on the uplink reference signal; and acquiring a reference delay difference reported by the terminal device, and acquiring an uplink transmission delay of the LOS path based on an uplink transmission delay of the reference path and the reference delay difference, where the reference delay difference is a difference between a downlink transmission delay of the LOS path and the downlink transmission delay of the reference path.

An embodiment of the present disclosure provides a method for positioning, which is applied to a positioning server in communicative connection with a base station and a terminal device respectively. The method may include, acquiring a downlink transmission delay of a line of sight (LOS) path sent by the terminal device and an uplink transmission delay of the LOS path sent by the base station, where the uplink transmission delay of the LOS path is obtained based on any one of the methods as described above; and determining location information of the terminal device based on the downlink transmission delay and the uplink transmission delay of the LOS path.

An embodiment of the present disclosure provides a terminal device, which may include a memory, a processor, and a computer program stored in the memory and executable by the processor which, when executed by the processor causes the processor to carry out the method which is applied to the terminal device as described above.

An embodiment of the present disclosure provides a base station, which may include a memory, a processor, and a computer program stored in the memory and executable by the processor which, when executed by the processor causes the processor to carry out the method that is applied to the base station as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims, and drawings.

BRIEF DESCRIPTION OF DRAWINGS

The drawings are intended to provide a further understanding of the technical scheme of the present disclosure and constitute a part of the specification, and they are intended to illustrate the technical scheme of the present disclosure in conjunction with the embodiments of the present disclosure but are not intended to limit the technical scheme of the present disclosure.

DETAILED DESCRIPTION

Figure 1:
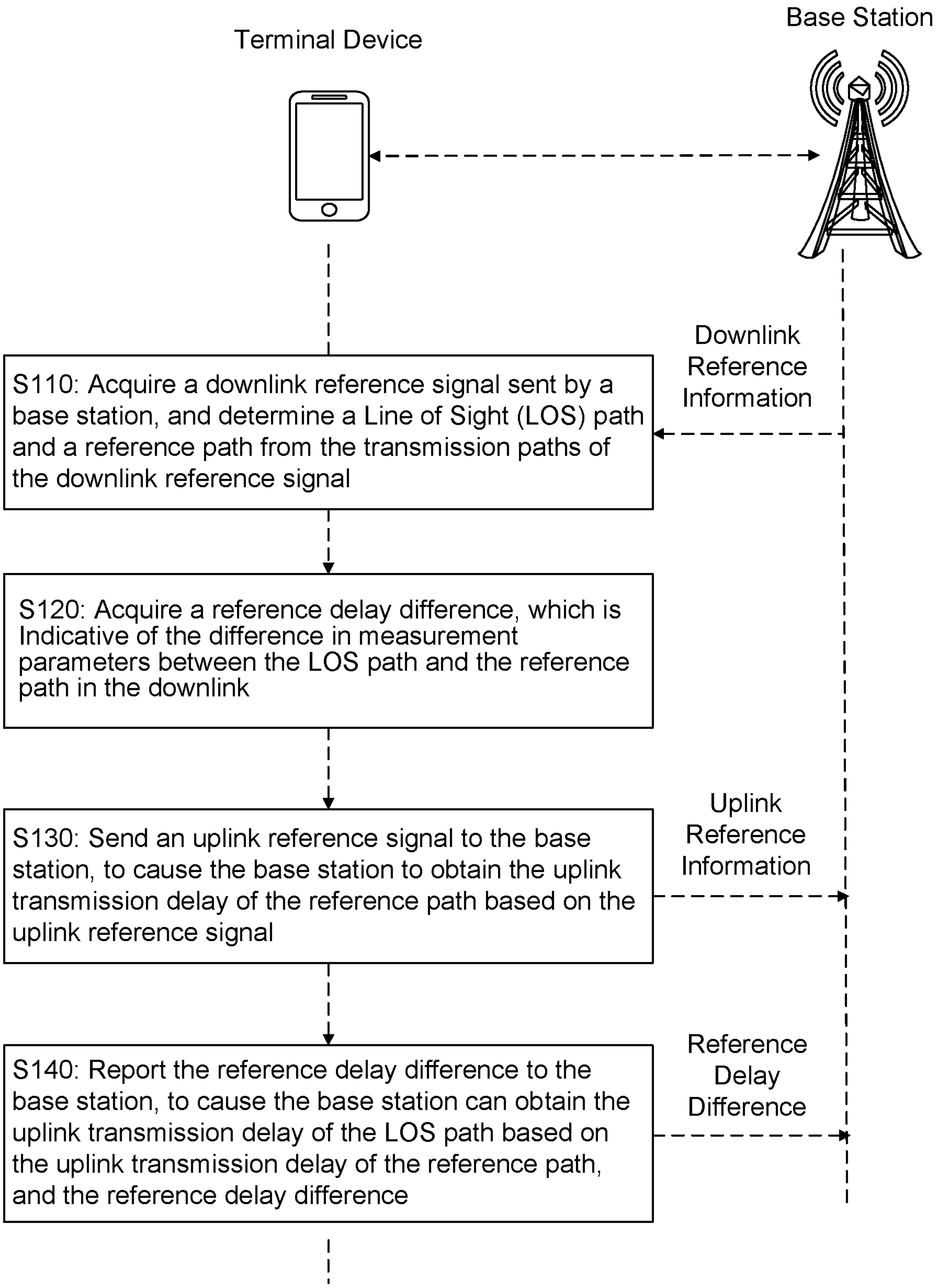
FIG. 1 depicts a flowchart showing a method for measuring transmission delay applied to a terminal device according to an embodiment of the present disclosure.

The purpose, technical scheme, and advantages of the present disclosure will become apparent through the following description for various embodiments in conjunction with the drawings. It should be understood that the embodiments described here are intended for illustration but not limitation of the present disclosure.

It should be noted that although the devices are shown with individual functional modules in the schematic diagram and the logical sequences are shown in the flow chart, in some cases, the devices can have different modules than those shown and the steps can be executed in a different order than those shown. The terms “first” and “second”, if used in the description, claims and the drawings are intended to distinguish similar objects, and do not necessarily imply any specific order or sequence.

Some embodiments of the present disclosure provide a method for measuring transmission delay, a method for positioning, a terminal device, a base station, and a storage medium. The method for measuring transmission delay includes, acquiring a downlink reference signal sent by a base station, and determining a line of sight (LOS) path and a reference path from a plurality of transmission paths of the downlink reference signal; acquiring a reference delay difference that is a difference between a downlink transmission delay of the LOS path and the downlink transmission delay of the reference path; sending an uplink reference signal to the base station, to cause the base station to obtain an uplink transmission delay of the reference path based on the uplink reference signal; and reporting the reference delay difference to the base station, to cause the base station to obtain the uplink transmission delay of the LOS path based on the uplink transmission delay of the reference path and the reference delay difference. According to the scheme set forth in an embodiment of the present disclosure, the base station is enabled to obtain the uplink transmission delay of the reference path through one uplink reference signal, and the uplink transmission delay of the LOS path is calculated through the uplink transmission delay of the reference path in conjunction with the reference delay difference, thus effectively reducing the resource overhead for measuring the uplink transmission delay of the LOS path.

It is worth noting that one of the technical backgrounds to which the technical scheme of the present disclosure is directed to the technical issue caused by the weak transmission power from a terminal device. However, even if the transmission power from a terminal device is sufficient, the base station can directly extract the signal corresponding to the LOS path from the transmission signal, and the method according to an embodiment of the present disclosure is still applicable to calculate the parameters of the LOS path in conjunction with the reference delay difference and the parameters of the reference path, which will not limit the technical scheme of the present disclosure.

Some embodiments of the present disclosure will be further illustrated with reference to the drawings.

FIG. 1 depicts a flowchart showing a method for measuring transmission delay according to an embodiment of the present disclosure. The method is applied to a terminal device, and includes but is not limited to operations S110, S120, S130 and S140.

At S110, a downlink reference signal sent by a base station is acquired, and a Line of Sight (LOS) path and a reference path are determined from the transmission paths of the downlink reference signal.

It should be noted that the downlink reference signal can be a downlink positioning reference signal for positioning. Other types of signals can be employed, provided that the terminal device is allowed to determine each transmission path based on the downlink reference signal. Those having ordinary skills in the art can conceive selecting a particular type of signal based on the practical requirement. This embodiment is not limited thereto.

It is worth noting that since the signal transmission power of the base station can generally be considered to be sufficiently high, it can be considered that the downlink reference signal received by the terminal device will not be overwhelmed by noise and interference. Based on this, the terminal device can directly determine the LOS path from the transmission paths of the downlink reference signal in any way. This embodiment does not limit the methods that the terminal device employs to determine the LOS path.

It should be noted that the reference path can be any path other than the LOS path. The selection of the reference path is intended to calculate the parameters of the LOS path by means of the parameters of the reference path in conjunction with the reference delay difference, and on the basis that the uplink path and the downlink path are identical. It is apparent that, the identical uplink and downlink paths can be achieved by employing the identical transmitting and receiving beams, and the present disclosure does not limit the beams.

It is worth noting that the signal transmission of the LOS path will be affected by factors such as transmission environment and interference. If the transmission power of the terminal device is increased, the signal power of the LOS path and the interference signal will increase in equal proportion. If the number of uplink reference signals is increased, the resource overhead will increase. Moreover, under the condition that the SNR of the transmission signal of the LOS path is extremely low, even if the number of uplink reference signals is increased, it may be inefficient for the base station to detect the transmission signal of the LOS path. Based on this, a reference path is introduced in this embodiment. The uplink transmission delay of the LOS path is calculated through the reference delay difference between the reference path and the LOS path, which can not only save resource overhead, but also eliminate direct measurements by calculation. Even if the SNR is extremely low, the uplink transmission delay of the LOS path can be accurately obtained.

It is worth noting that under the condition that the transmission signal of the LOS path is not submerged, the base station can directly measure the uplink transmission delay. Alternatively, the technical scheme set forth in an embodiment of the present disclosure can be adopted to calculate the uplink transmission delay of the LOS path through the reference delay difference between the LOS path and the reference path, so that the measurement can be transformed into a calculation to ensure that the uplink transmission delay of the LOS path can be accurately obtained. Those having ordinary skills in the art can conceive presetting the acquisition scheme of the uplink transmission delay of the LOS path at the base station, and the terminal device only needs to send the corresponding uplink reference signal based on the acquisition scheme set by the base station, while this embodiment is not limited thereto.

At S120, a reference delay difference, which is the difference between the downlink transmission delay of the LOS path and the downlink transmission delay of the reference path, is acquired.

It should be noted that the reference delay difference can be the difference obtained by subtracting the downlink transmission delay of the reference path from the downlink transmission delay of the LOS path. Since the uplink transmission path and the downlink transmission path can be identical, the reference delay difference at the terminal device side is identical to the reference delay difference at the base station side. Based on this, the reference delay difference is calculated at the terminal device side by means of the strong signal power of the downlink reference signal received by the terminal device. Even if the signal power received by the base station is weak, the uplink transmission delay of the LOS path can be calculated by measuring the uplink reference delay of the reference path in conjunction with the reference delay difference. Therefore, through the technical scheme of this embodiment, the uplink transmission delay of the LOS path can be obtained with at least one reference delay difference and one uplink reference signal which enables the base station to identify the reference path, thus effectively reducing the required number of transmissions of uplink reference signals in RTT measurement and saving the resource overhead.

At S130, an uplink reference signal is sent to the base station, to cause the base station to obtain the uplink transmission delay of the reference path based on the uplink reference signal.

It should be noted that the uplink reference signal may be an uplink positioning reference signal for positioning, such as a common SRS, and this embodiment does not specifically limit this.

It should be noted that in order to ensure that the base station can measure the uplink transmission delay of the reference path, the transmission path with the strongest signal power can be taken as the reference path. The uplink transmission delay can be measured in any way, and this embodiment does not limit this.

It can be understood that since the reference path is selected by the terminal device from the transmission paths, the reference path is unknown to the base station. As a consequence, the terminal device and the base station can make an agreement in advance on the scheme of identification for the reference path, in which, for example, same beam is set in advance through configuration information, and the path with the strongest signal power is taken as the reference path, this embodiment does not specifically limit this.

At S140, the reference delay difference is reported to the base station, to cause the base station can obtain the uplink transmission delay of the LOS path based on the uplink transmission delay of the reference path, and the reference delay difference.

It should be noted that based on the description regarding S120, the uplink transmission delay of the LOS path can be measured by employing the principle that the reference delay difference of the transmission path is identical at both transmitting and receiving ends. The base station obtains and takes the sum of the uplink transmission delay of the reference path and the reference delay difference, as the uplink transmission delay of the LOS path.

It should be noted that the reference delay difference can be reported in an appropriate scheme based on the practical requirements. Those having ordinary skills in the art are able to determine a particular scheme for reporting by modifying the configuration information of the equipment. For example, in the case of sufficient signaling resources, the terminal device is configured through the configuration information to report through additional signaling interaction, and the reference delay difference is directly informed to the base station. With this technical scheme, only one uplink reference signal is needed to be sent to the base station, so that the base station can determine the uplink transmission delay of the reference path, and in turn obtain the uplink transmission delay of the LOS path, which is beneficial to saving the resource overhead caused by the transmission of the uplink reference signal. Alternatively, it is also possible to pre-configure the base station with a scheme in that an uplink reference signal is employed to carry the reference delay difference for reporting. In that case, one uplink reference signal is modulated based on the reference delay difference. After receiving the uplink reference signal modulated based on the reference delay difference, the base station can obtain the reference delay difference by measuring the difference of reference paths reflected in the two uplink reference signals. By means of this technical scheme, the uplink transmission delay of the LOS path can be measured by the transmission of only two uplink reference signals, which effectively reduces the resource overhead.

Figure 2:
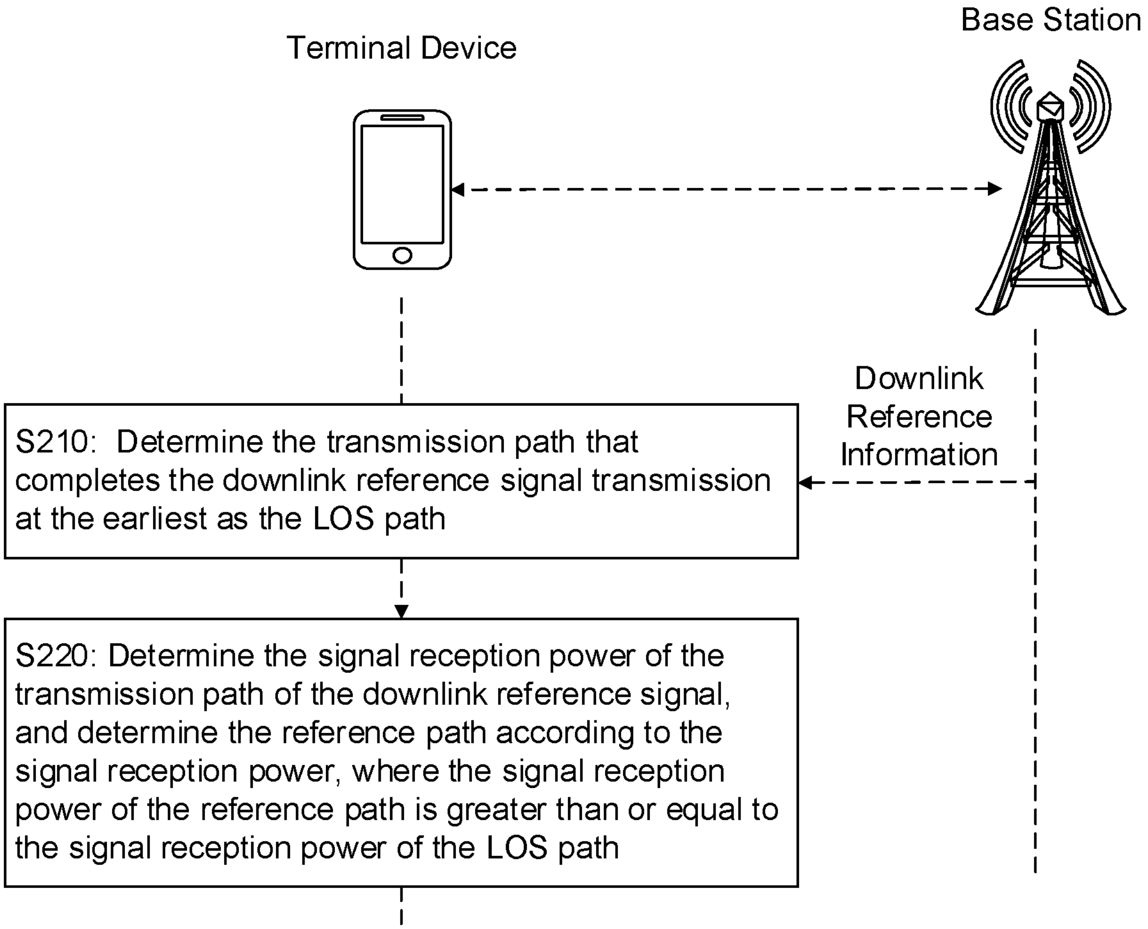
FIG. 2 depicts a flowchart showing the determination of an LOS path and a reference path according to another embodiment of the present disclosure.

Referring to FIG. 2, in an embodiment, S110 in the embodiment shown in conjunction with FIG. 1 further includes, but is not limited to, the following operations.

At S210, the transmission path that completes the downlink reference signal transmission at the earliest is determined as the LOS path.

At S220, the signal reception power of the transmission path of the downlink reference signal is determined, and the reference path is determined based on the signal reception power, where the signal reception power of the reference path is greater than or equal to the signal reception power of the LOS path.

It should be noted that since the LOS path is a transmission path with no reflection of the transmission signals, it can be clear that the downlink reference signal transmitted will reach the terminal device earliest through the LOS path. The transmission power of the base station is typically sufficient, and thus it is not likely that the transmission signal of the LOS path is submerged by noise, so it can be determined that the transmission path of the earliest received downlink transmission signal is the LOS path.

It can be understood that the reference path may be any path other than the LOS path, for example, the path with the strongest signal power is selected for ease of identification, or the weighted transmission path of all transmission paths is taken as the reference path. For example, the weighted transmission path of all transmission paths described above may be obtained by multiplying the delay of each transmission path by the signal power, and the obtained value is summed up and then divided by the sum of the signal power of all the transmission paths to obtain a virtual path. The specific scheme of selection of the reference path may be determined in accordance with the specific conditions of the transmission signal. It can be understood that in order to reduce the resource overhead, only one transmission path may be selected as the reference path. It is apparent that, the number of reference paths can be appropriately increased under the condition of sufficient resources, so as to improve the accuracy of data measurement, this embodiment does not limit this.

Figure 3:
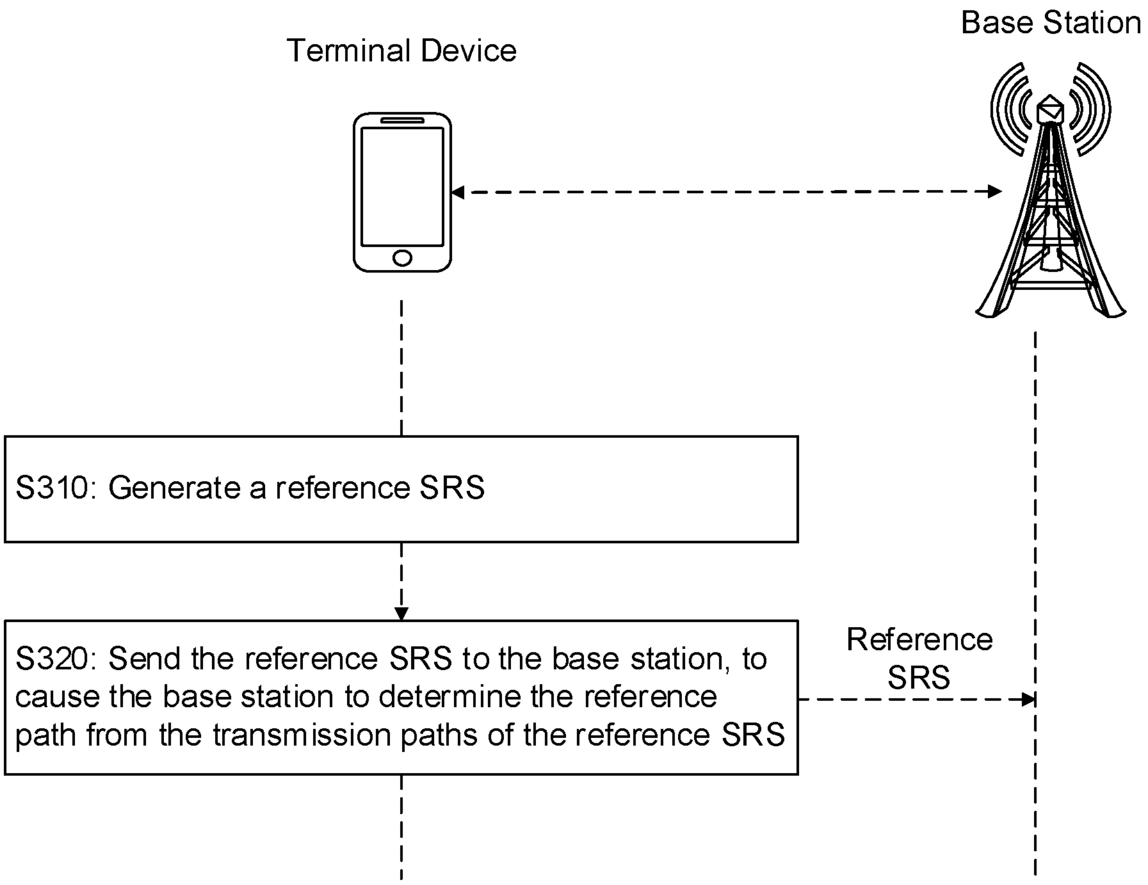
FIG. 3 depicts a flowchart showing the generation of a Sounding Reference Symbol (SRS) according to yet another embodiment of the present disclosure.

In an embodiment, the uplink reference signal is the Sounding Reference Symbol (SRS). Referring to FIG. 3, operation S130 in the embodiment shown in FIG. 1 further includes, but is not limited to, the following operations.

At S310, a reference SRS is generated.

At S320, the reference SRS is sent to the base station, to cause the base station to determine the reference path from the transmission path of the reference SRS.

It should be noted that for the orthogonal frequency division multiplexing (OFDM) system, the uplink reference signal is SRS. The SRS can be generated by means of the SRS configuration method specified in the existing protocol or standard and sent, so that the time delay obtained by the base station through the reference SRS is the real-time delay. The reference SRS provides a reference for the subsequent uplink transmission delay calculation of the LOS path.

Figure 4:
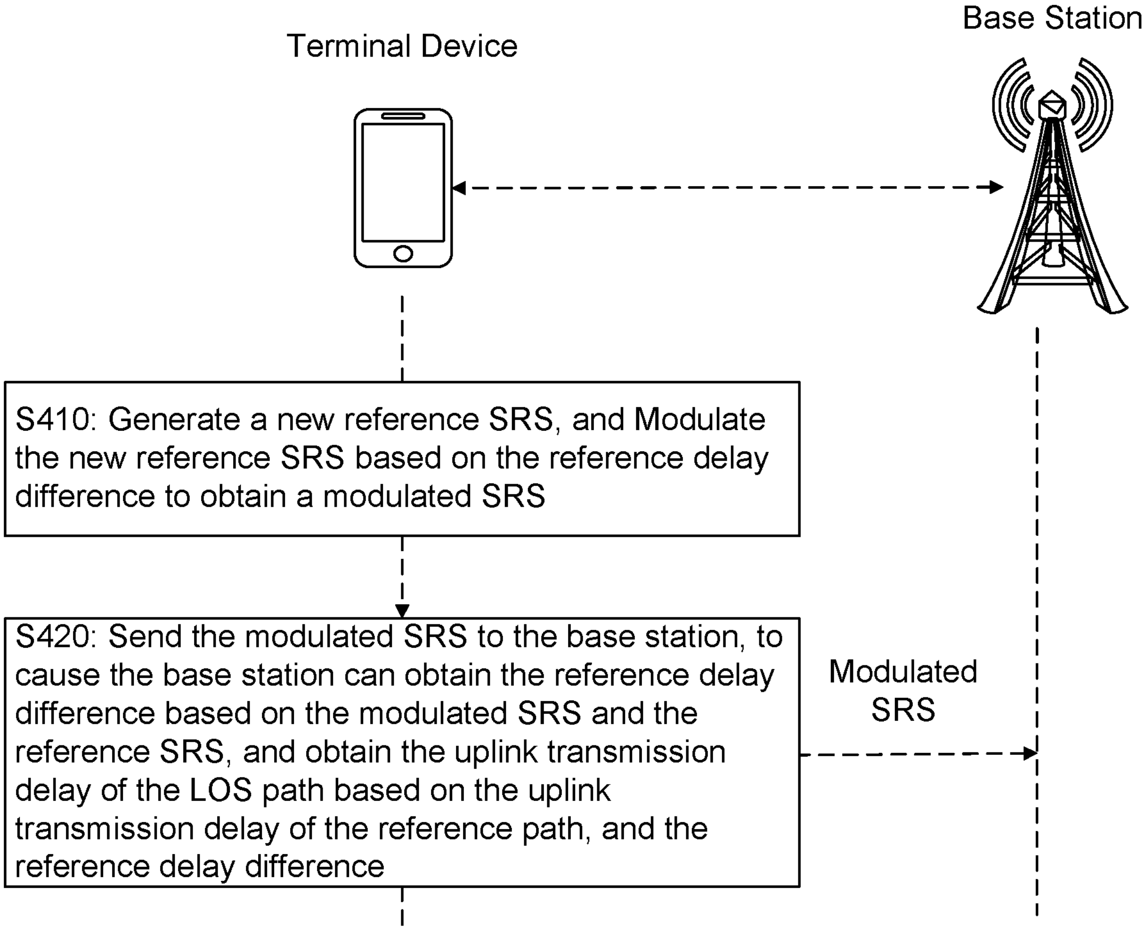
FIG. 4 depicts a flowchart showing the report of a reference delay difference by a modulated SRS according to yet another embodiment of the present disclosure.

Referring to FIG. 4, in an embodiment, S140 in the embodiment shown in conjunction with FIG. 1 further includes, but is not limited to, the following operations.

At S410, a new reference SRS is generated, and the new reference SRS is modulated based on the reference delay difference to obtain a modulated SRS.

At S420, the modulated SRS is sent to the base station, to cause the base station can obtain the reference delay difference based on the modulated SRS and the reference SRS, and obtain the uplink transmission delay of the LOS path based on the uplink transmission delay of the reference path, and the reference delay difference.

It should be noted that the identification scheme of reference SRS and modulated SRS may be preset in the base station. For example, the terminal device sends two consecutive OFDM symbols to the base station in one time slot, in which the SRS on the first received OFDM symbol is the reference SRS, and the SRS on the second received OFDM symbol is the modulated SRS. Those having ordinary skills in the art know how to make configurations in the base station, and which will not be described here.

It should be noted that for OFDM systems, the expression of the uplink reference signal is s(k, l), where k denotes the frequency index; l denotes the symbol index, then the expression of the transmitted reference SRS can be $s_{tx}(k, l_{ref})=s(k, l_{ref})$. In order to carry the reference delay difference, modulation can be performed based on the reference SRS. For example, the modulated SRS obtained by modulation is $s_{tx}(k, l_{ref})=s(k, l)\cdot\exp(j2\pi\eta\Delta\tau_{los,ref}k\Delta f+\phi)$, where j denotes the imaginary part; π denotes pi, $\Delta\tau_{los,ref}$ denotes the reference delay difference; ϕ denotes a preset phase value, k denotes a frequency index, Δf denotes a subcarrier interval of the terminal device, and η denotes a preset scaling parameter for the terminal device and the base station, for example, η can be set to ±1. Compared with the fact that the reference SRS can reflect the real delay of uplink transmission, through the modulated SRS as an OFDM symbol, the delay received by the receiving end can generate some deviations, and the generated deviation is related to the reference delay difference. Through the technical scheme of this embodiment, the acquisition of the reference delay difference can be transformed into the acquisition of the difference between symbols. As such, the terminal device only needs to send SRS over two symbols to the base station. That is, the calculation of the uplink transmission delay of the LOS path can be realized, even if the transmission power of the terminal device is weak, since the transmission path with the strongest signal power is selected as the reference path, the difference of the reference path between two symbols can be obtained, so the transmission of multiple uplink reference signals is not necessary, which effectively saves resources.

It can be understood that the reference delay difference based on the reference SRS and the modulated SRS can be obtained by channel feature estimation. A case where both transmitting and receiving ends employ an identical transmitting beam and receiving beam is illustrated below.

For the reference SRS, if the channel is H(k, l), the reference SRS received by the base station can be expressed as: $s_{rx}(k, l_{ref})=H(k, l_{ref})\cdot s(k, l_{ref})+N(k, l_{ref})$, where $N(k, l_{ref})$ denotes noise and interference, then the estimated channel features of the reference SRS can be expressed as:

$$\hat{H}(k, l_{ref}) = \frac{s_{rx}(k, l_{ref})}{s(k, l_{ref})} = H(k, l_{ref}) + \frac{N(k, l_{ref})}{s(k, l_{ref})}.$$

It can be understood by those having ordinary skills in the art that the uplink reference delay of the reference path, which can be denoted such as $\tau_{BS,ref}$, can be estimated by means of Fourier transform.

For the modulated SRS, referring to the above discussion, the signal received by the base station can be expressed as: $s_{rx}(k, l)=H(k, l)\cdot s(k, l)\cdot \exp(j2\pi\eta\Delta\tau_{los,ref}k\Delta f+\phi)+N(k, l)$. The estimated channel features of the modulated SRS can be expressed as $$\hat{H}(k, l) = \frac{s_{rx}(k, l)}{s(k, l)} = H(k, l)\cdot \exp\left(j2\pi\eta\Delta\tau_{los,ref}k\Delta f + \phi\right) + \frac{N(k, l)}{s(k, l)}.$$

Through the above estimations, the uplink reference delay of the reference path can be estimated as $\tau_{BS,non\text{-}ref}=T_{BS,ref}-\eta\Delta\tau_{los,ref}$.

Since the reference delay difference at the base station side and the reference delay difference at the terminal device side should be identical, thus $\Delta\tau_{los,ref}=(T_{BS,ref}-T_{BS,non\text{-}ref})/\eta$. And due to $\Delta\tau_{los,ref}=\tau_{BS,los}-T_{BS,ref}$, where $\tau_{BS,los}$ denotes the uplink reference delay of the LOS path, and thus $T_{BS,los}=\Delta\tau_{los,ref}+\tau_{BS,ref}=(T_{BS,ref}-T_{BS,non\text{-}ref})/\eta+\tau_{BS,ref}$. It can be seen that it is complicated to obtain the reference delay difference by direct demodulation, while based on the above equations, the acquisition of the reference delay difference can be transformed into the calculation of $\tau_{BS,ref}-T_{BS,non\text{-}ref}$, i.e., the uplink transmission delay of the reference SRS and the modulated SRS in the reference path. Since the reference path is the transmission path with the strongest signal power, the measurement of the uplink transmission delay for the reference path is relatively simple. As such, the calculation of uplink transmission delay of LOS path is achieved with only two symbols SRS, thus simplifying the measurement.

Figure 5:
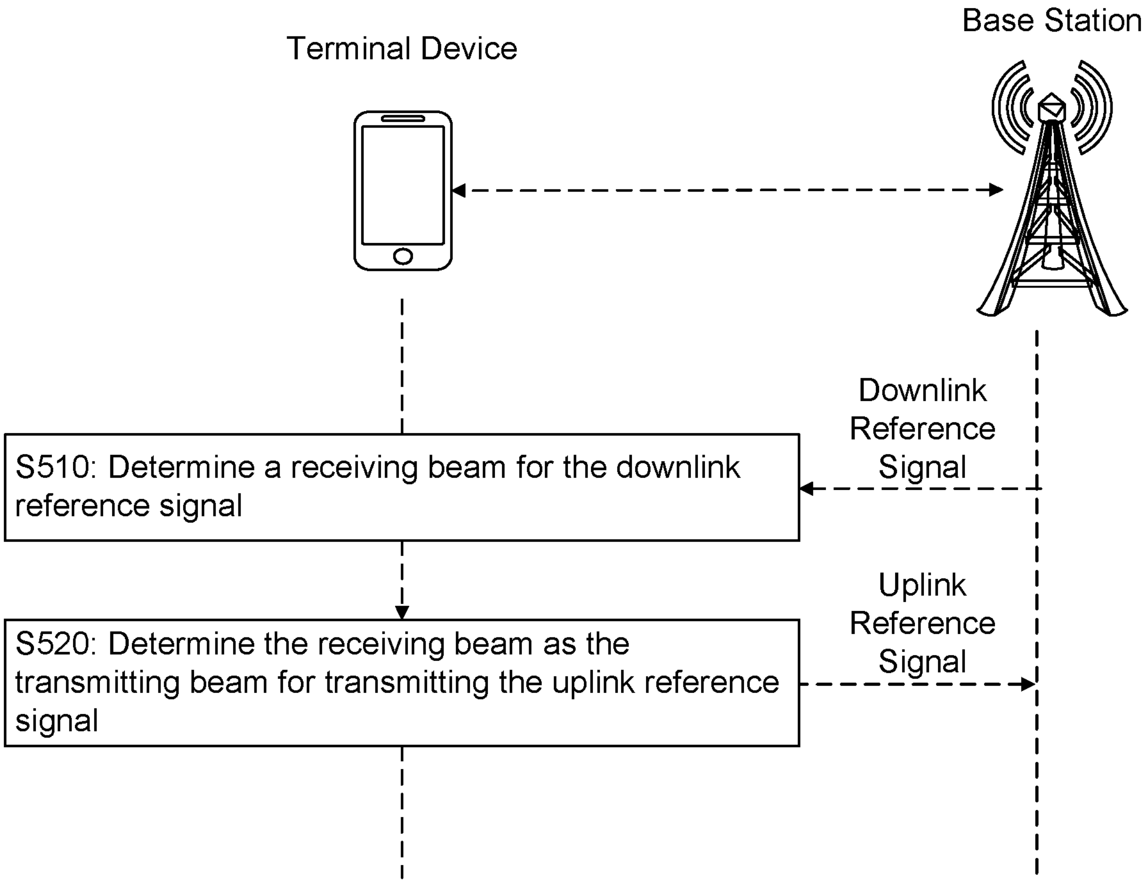
FIG. 5 depicts a flowchart showing the determination of a transmitting beam according to yet another embodiment of the present disclosure.

Referring to FIG. 5, in an embodiment, before S130 described in the embodiment shown in FIG. 1, the method further includes but is not limited to the following operations.

At S510, a receiving beam for the downlink reference signal is determined.

At S520, the receiving beam is determined as the transmitting beam for transmitting the uplink reference signal.

It should be noted that the utilization of identical beam in both uplink and downlink channels can keep the relative relationship between transmission paths unchanged to the most extent. For example, the delay difference between different paths is identical, and the transmission powers of signals are close, thus reducing the measurement error caused by beams.

Figure 6:
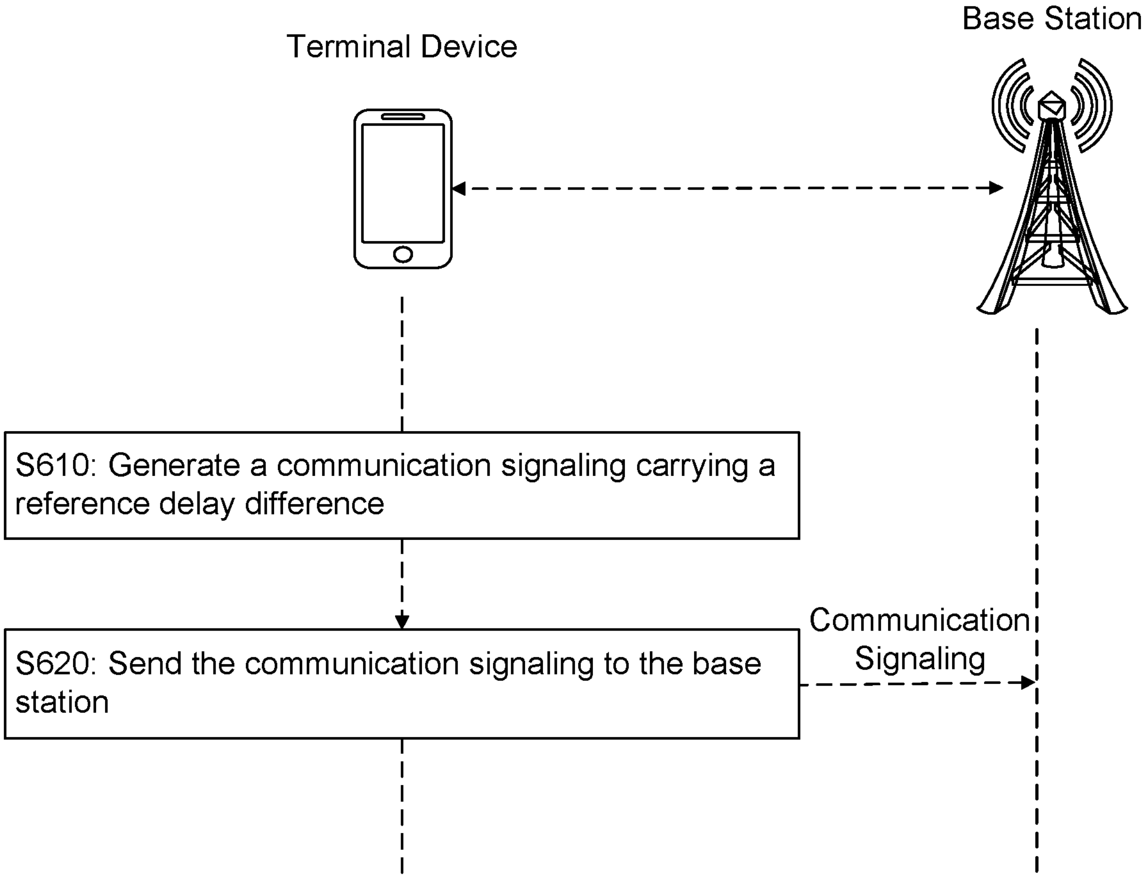
FIG. 6 depicts a flowchart showing the report of a reference delay difference through communication signaling according to yet another embodiment of the present disclosure.

Referring to FIG. 6, in an embodiment, S140 in the embodiment shown in conjunction with FIG. 1 further includes, but is not limited to, the following operations.

At S610, a communication signaling carrying a reference delay difference is generated.

At S620, the communication signaling is sent to the base station.

It should be noted that due to the stronger power of the downlink reference signal received at the terminal device side, it is easier to measure the reference delay difference. According to the description in the above embodiments, the reference delay difference between the terminal device side and the base station side can be considered identical under the condition that the transmission path features are identical. Therefore, under the condition of sufficient signaling resources, the reference delay difference can be directly reported to the base station through signaling interaction. The base station obtains the uplink transmission delay of the reference path based on the reference SRS after obtaining the reference SRS, and obtains the uplink transmission delay of the LOS path based on the sum of the uplink transmission delay and the reference delay difference.

Figure 7:
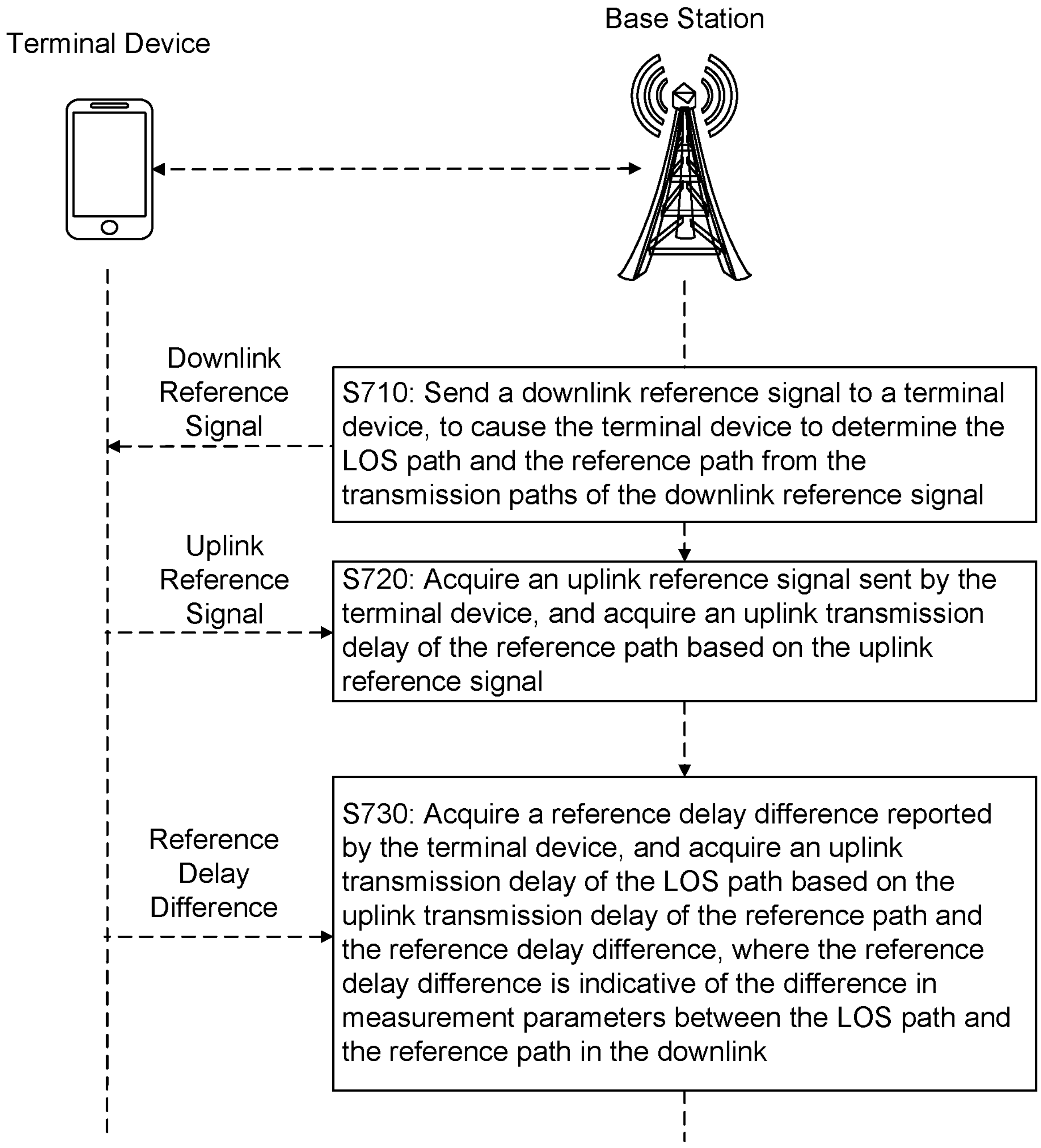
FIG. 7 depicts a flowchart showing a method for measuring transmission delay applied to a base station according to an embodiment of the present disclosure.

Referring to FIG. 7, an embodiment of the present disclosure provides a method for measuring transmission delay, which is applied to a base station. The method includes but is not limited to operations S710, S720 and S730.

At S710, a downlink reference signal is sent to a terminal device, to cause the terminal device to determine the LOS path and the reference path from the transmission paths of the downlink reference signal.

At S720, an uplink reference signal sent by the terminal device is acquired, and an uplink transmission delay of the reference path is acquired based on the uplink reference signal.

At S730, a reference delay difference reported by the terminal device is acquired, and an uplink transmission delay of the LOS path is acquired based on the uplink transmission delay of the reference path and the reference delay difference, where the reference delay difference is the difference between a downlink transmission delay of the LOS path and a downlink transmission delay of the reference path.

It should be noted that the downlink reference signal sent by the base station to the terminal device may be triggered by a request for positioning that may be initiated by the base station, the terminal device or the positioning server, which is not limited in this embodiment.

It should be noted that the scheme of interaction between the base station and the terminal device for measuring the uplink transmission delay of the LOS path can refer to the description of the embodiment shown in FIG. 1, and will not be repeated here for the sake of simplicity.

It can be understood that the base station and the terminal device can agree on the reporting scheme of the reference delay difference through the configuration information, thus the uplink transmission delay of the LOS path can be obtained in conjunction with the uplink transmission delay of the reference path. However, those having ordinary skills in the art can also conceive making relevant configuration at the base station, and determining the signal strength after receiving the uplink reference signal, such as setting a certain power threshold or trying to obtain the uplink transmission delay of the LOS path. If the signal strength of the uplink reference signal is sufficient to directly obtain the uplink transmission delay of the LOS path, the uplink transmission delay of the LOS path can be directly obtained according to the practical requirement. Alternatively, the technical scheme set forth in an embodiment of the present disclosure can still be adopted, and the uplink transmission delay of the LOS path can be calculated through the uplink transmission delay of the reference path in conjunction with the reference delay difference, which is not limited in this embodiment.

Figure 8:
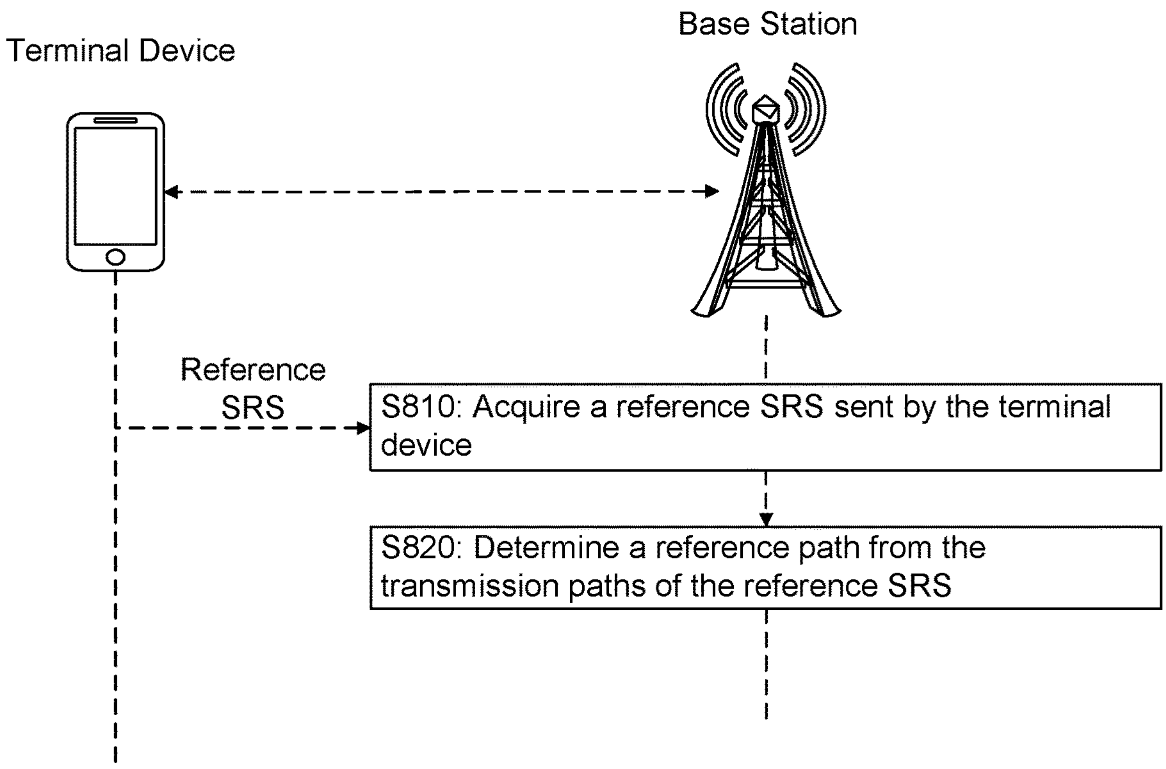
FIG. 8 depicts a flowchart showing the generation of a reference SRS according to yet another embodiment of the present disclosure.

In an embodiment, as shown in FIG. 8, the uplink reference signal is the Sounding Reference Symbol (SRS). Referring to FIG. 8, operation S720 in the embodiment shown in FIG. 7 further includes, but is not limited to, the following operations.

At S810, a reference SRS sent by the terminal device is acquired.

At S820, a reference path is determined from the transmission paths of the reference SRS.

It should be noted that the method for determining the reference path after the base station receives the SRS can refer to the description of the embodiment shown in FIG. 3, and will not be repeated here for the sake of simplicity.

Figure 9:
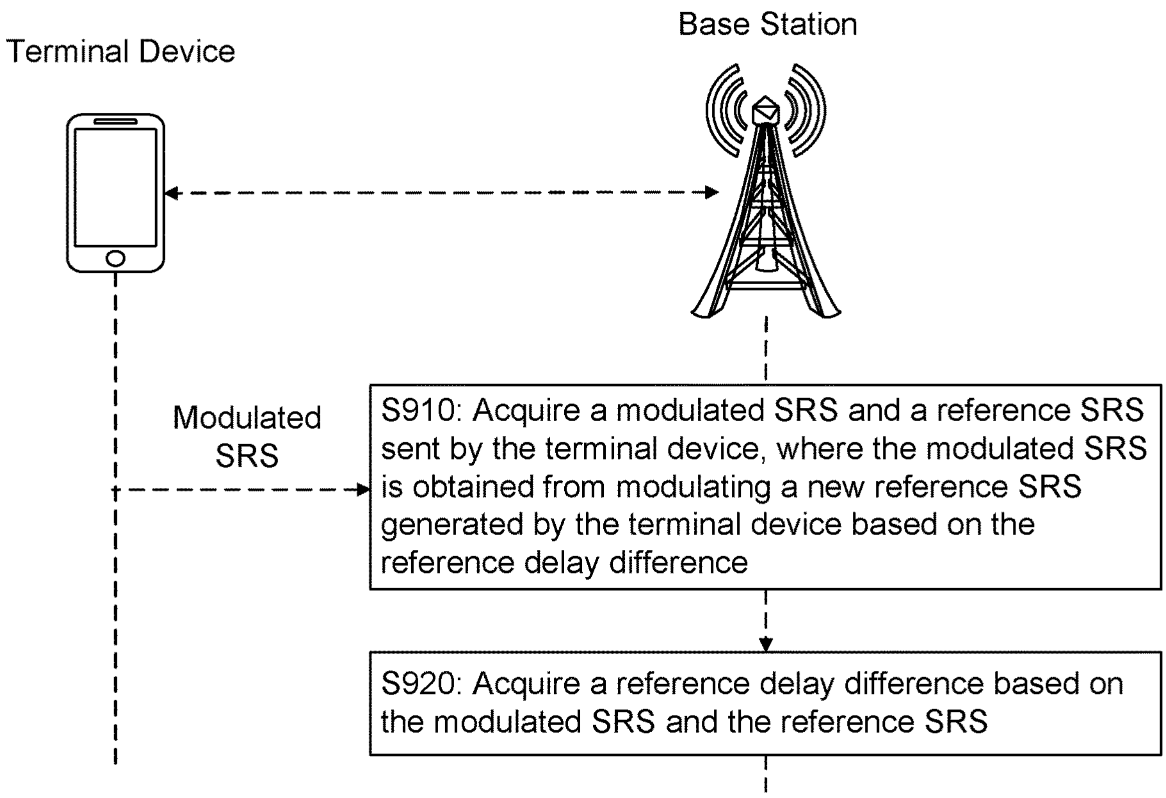
FIG. 9 depicts a flowchart showing the acquisition of a reference delay difference according to yet another embodiment of the present disclosure.

Referring to FIG. 9, in an embodiment, S730 in the embodiment shown in conjunction with FIG. 7 further includes, but is not limited to, the following operations.

At S910, a modulated SRS and a reference SRS sent by the terminal device are acquired, where the modulated SRS is obtained from modulating a new reference SRS generated by the terminal device based on the reference delay difference.

At S920, a reference delay difference is acquired based on the modulated SRS and the reference SRS.

It should be noted that the method of obtaining the reference delay difference based on the modulated SRS and the reference SRS can refer to the description of the embodiment shown in FIG. 4, and will not be repeated here for the sake of simplicity.

Figure 10:
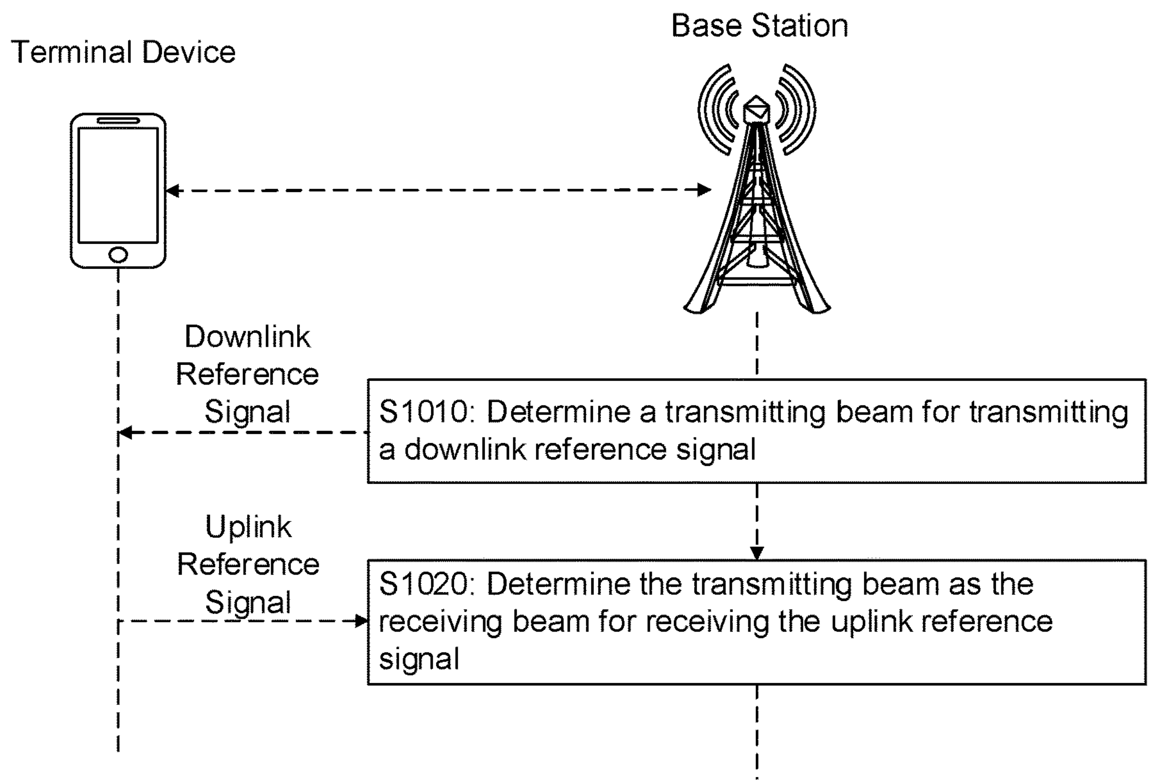
FIG. 10 depicts a flowchart showing the determination of a receiving beam according to yet another embodiment of the present disclosure.

Referring to FIG. 10, in an embodiment, before S720 described in the embodiment shown in FIG. 7, the method further includes but is not limited to the following operations.

At S1010, a transmitting beam for transmitting a downlink reference signal is determined.

At S1020, the transmitting beam is determined as the receiving beam for receiving the uplink reference signal.

It should be noted that the principle that the uplink reference signal and the downlink reference signal utilize identical beam can refer to the description of the embodiment shown in FIG. 5, and will not be repeated here for simplicity.

Figure 11:
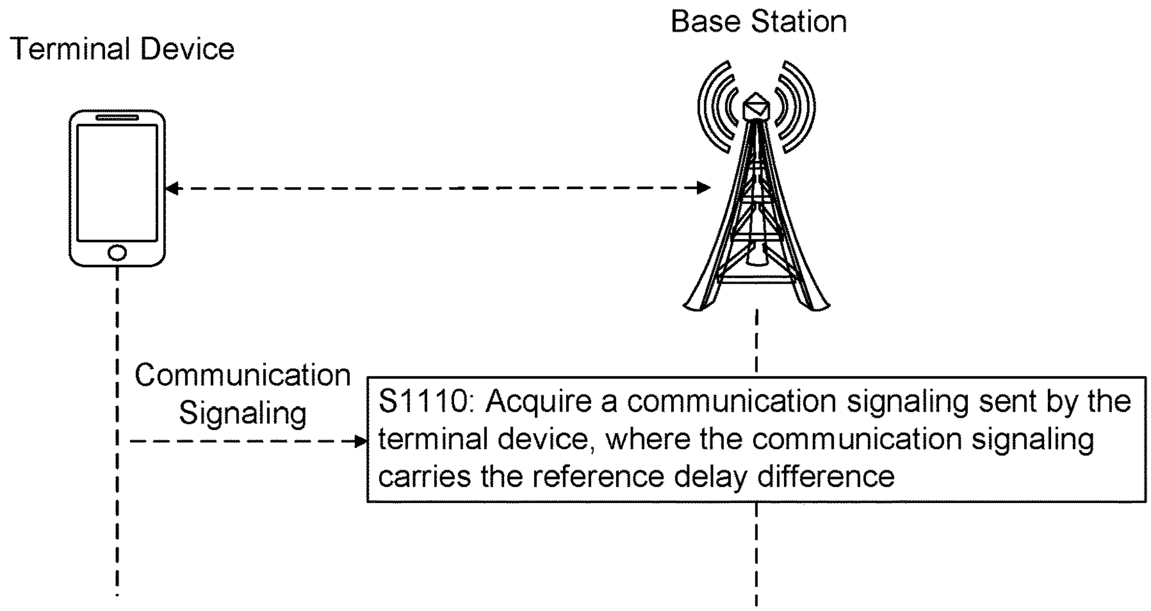
FIG. 11 depicts a flowchart showing the acquisition of a reference delay difference through communication signaling according to yet another embodiment of the present disclosure.

Referring to FIG. 11, in an embodiment, S730 in the embodiment shown in conjunction with FIG. 7 further includes, but is not limited to, the following operations.

At S1110, a communication signaling sent by the terminal device is acquired, where the communication signaling carries the reference delay difference.

It should be noted that the principle of obtaining the reference delay difference through communication signaling can refer to the description of the embodiment shown in FIG. 6, and will not be repeated here for the sake of simplicity.

The technical scheme of the present disclosure is illustrated below by way of two examples, for better understanding of the method for measuring transmission delay according to some embodiment of the present disclosure.

It should be noted that in both of the following examples, SRS is utilized as the uplink reference signal; the reference path is taken as the transmission path with the strongest signal power. Also, the transmitting beam and the receiving beam of the uplink reference signal and the downlink reference signal can be considered to be identical to ensure that the relative relationship between the transmission paths is identical.

Figure 12:
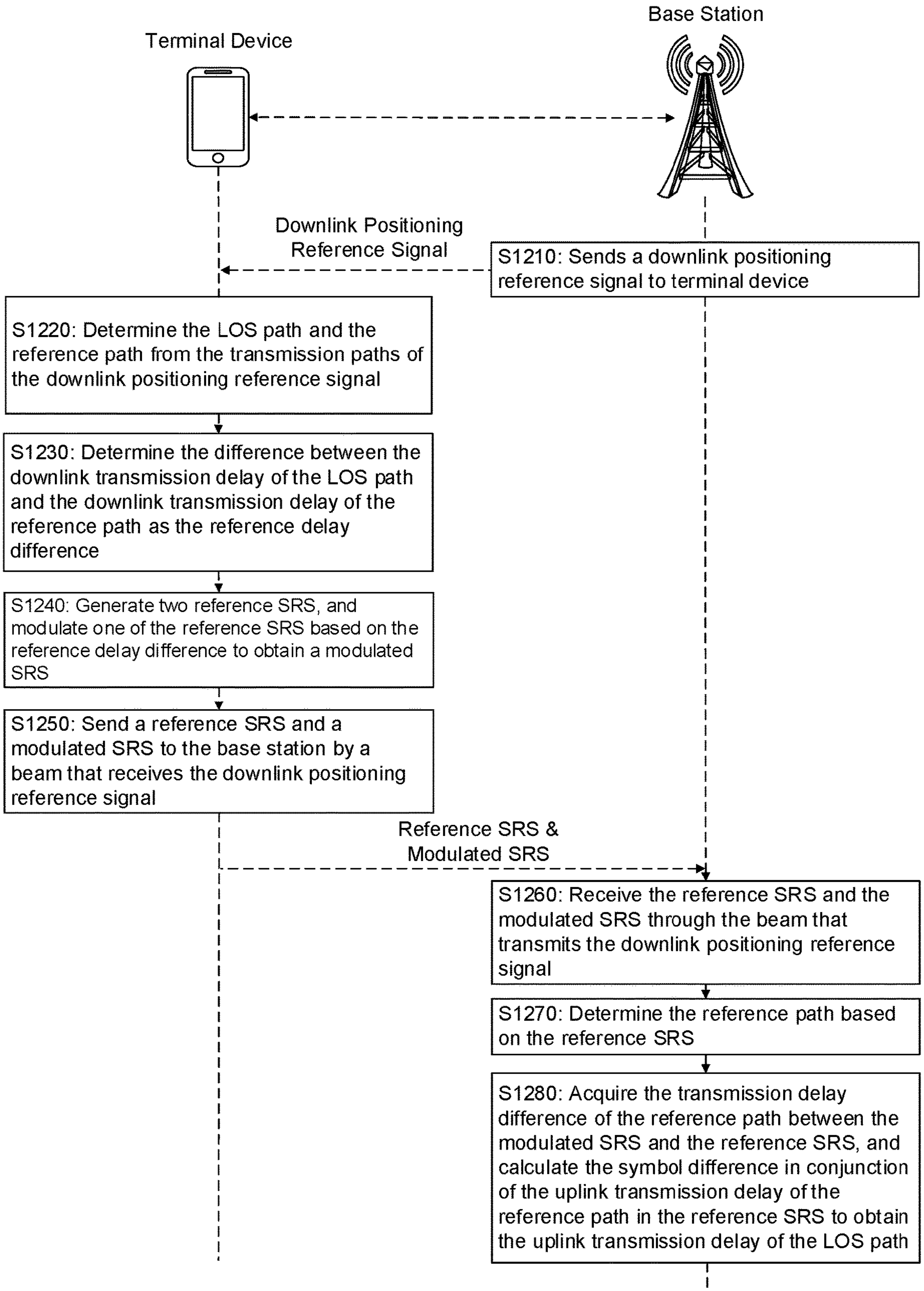
FIG. 12 depicts a flowchart of example embodiment 1 according to yet another embodiment of the present disclosure.

Example embodiment 1: reporting the reference delay difference by modulated SRS. Referring to FIG. 12, the method for measuing transmission delay includes but is not limited to the following operations At S1210, a base station sends a downlink positioning reference signal to a terminal device.

At S1220, the terminal device determines the LOS path and the reference path from the transmission paths of the downlink positioning reference signal.

At S1230, the terminal device determines the difference between the downlink transmission delay of the LOS path and the downlink transmission delay of the reference path as the reference delay difference.

At S1240, the terminal device generates two reference SRSs, and modulates one of the reference SRSs based on the reference delay difference to obtain a modulated SRS.

At S1250, the terminal device sends a reference SRS and a modulated SRS to the base station by a beam that receives the downlink positioning reference signal.

At S1260, the base station receives the reference SRS and the modulated SRS through the beam that transmits the downlink positioning reference signal.

At S1270, the base station determines the reference path based on the reference SRS.

At S1280, the base station obtains the transmission delay difference of the reference path between the modulated SRS and the reference SRS, and calculates the symbol difference in conjunction of the uplink transmission delay of the reference path in the reference SRS to obtain the uplink transmission delay of the LOS path.

Figure 13:
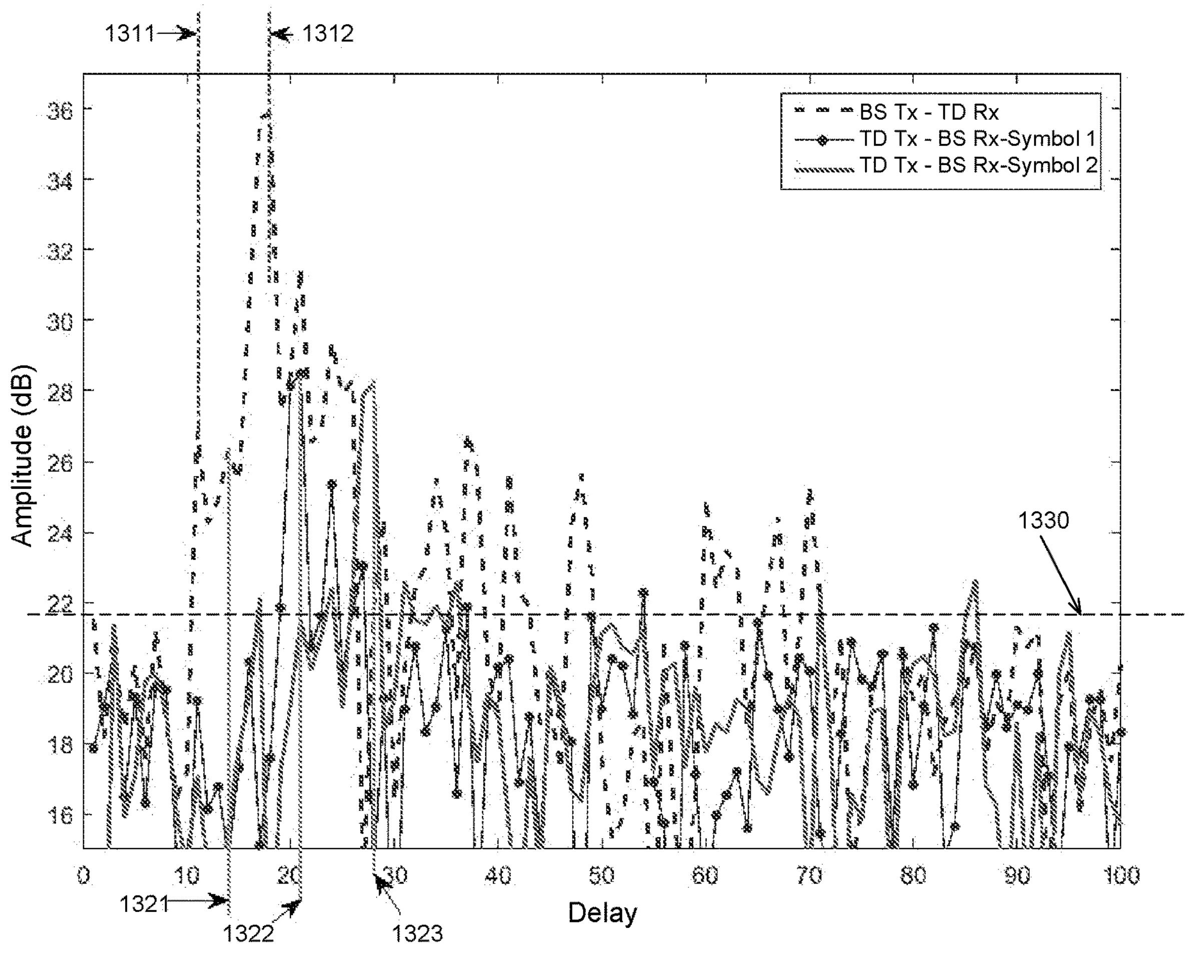
FIG. 13 depicts a spectrum diagram of example embodiment 1 shown in FIG. 12.

FIG. 13 depicts a spectrum diagram obtained based on the embodiment shown in FIG. 12. In FIG. 13, the signal at the lower side of the noise floor reference line 1330 is the noise floor, i.e., the waveform formed by noise and interference in the transmission path. Since the transmission (Tx) power of the base station (BS) is sufficient, it can be determined in the spectrum received (Rx) by the terminal device (TD) that the first detected signal is the downlink positioning reference signal transmitted through the LOS path, i.e., the first peak 1311 shown in FIG. 13. The signal transmission path corresponding to the first peak 1311 can be considered as the LOS path, and the point with the largest signal power is the second peak 1312, so the signal transmission path corresponding to the second peak 1312 is the reference path.

It is worth noting that in the two symbols sent by the terminal device to the base station, symbol 1 shown in the FIG. 13 is the reference SRS, symbol 2 is the modulated SRS, and the first peak 1311 is generated before the second peak 1312. Since both the transmitting end and the receiving end employ an identical beam, it can be considered that the transmission signal sent through the LOS path received at the base station side should also be prior to the transmission signal sent through the reference path. As can be seen from FIG. 13, for the reference SRS, the point with the strongest signal power is the fourth peak 1322, and the third peak 1321 to the left of the fourth peak 1322 is at the lower side of the noise floor reference line 1330, that is, the transmission signal of the LOS path has been submerged by noise. Therefore, the fifth peak 1323 obtained by modulated SRS and the fourth peak 1322 corresponding to the reference SRS correspond to the reference path and are easy to detect in the frequency spectrum. Therefore, the uplink transmission delay of the reference path can be obtained, and then the uplink transmission delay of the LOS path can be calculated by the above method. Thereby, the measurement of the uplink transmission delay of the LOS path can be completed by SRS over only two symbols under the condition of low power of the terminal device, and the resource overhead in the RTT measurement is reduced.

Figure 14:
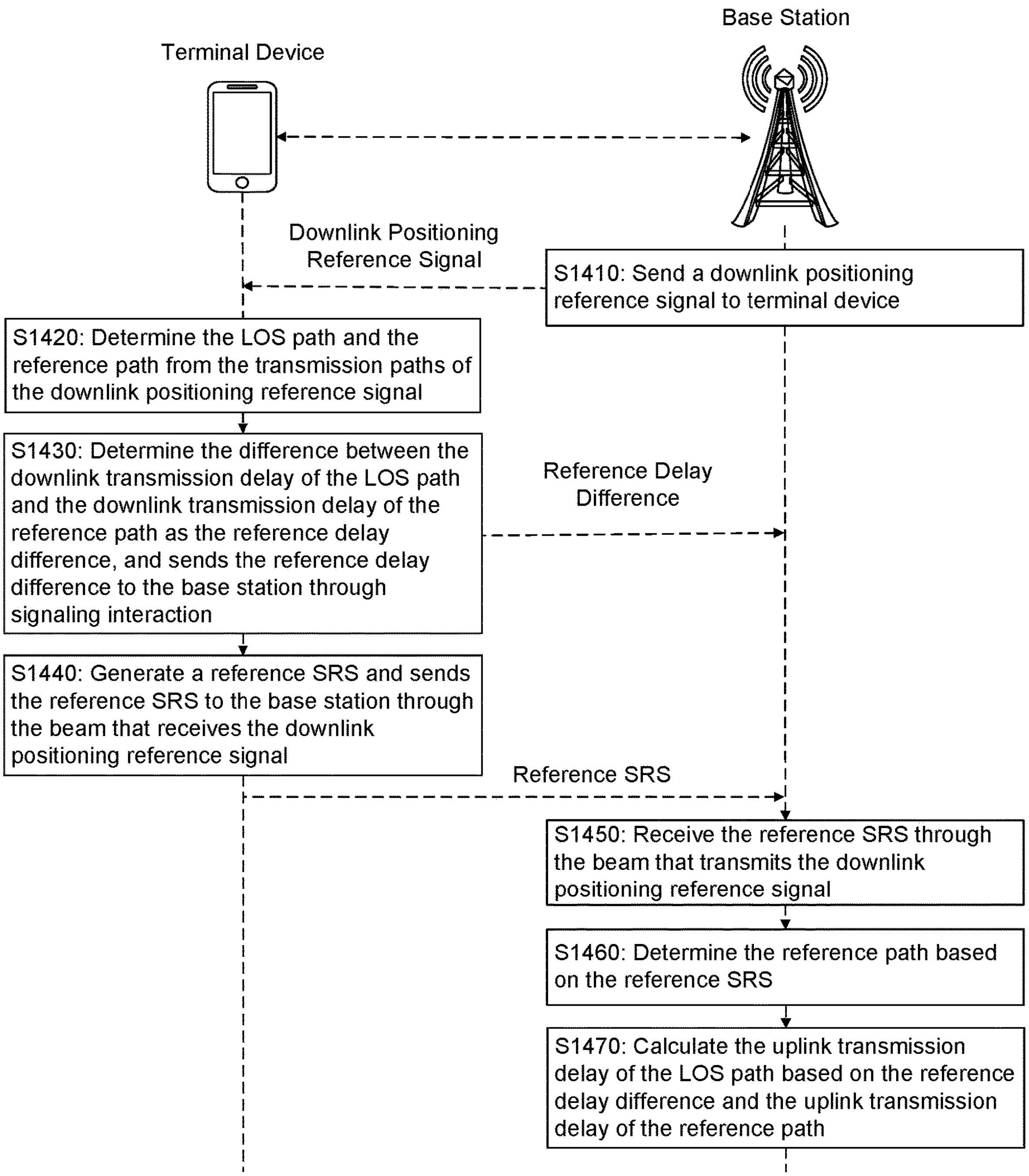
FIG. 14 depicts a flowchart of example embodiment 2 according to yet another embodiment of the present disclosure.

Example embodiment 2: reporting the reference delay difference through signaling interaction. Referring to FIG. 14, the method for measuring transmission delay includes but is not limited to the following operations.

At S1410, a base station sends a downlink positioning reference signal to a terminal device.

At S1420, the terminal device determines the LOS path and the reference path from the transmission paths of the downlink positioning reference signal.

At S1430, the terminal device determines the difference between the downlink transmission delay of the LOS path and the downlink transmission delay of the reference path as the reference delay difference, and sends the reference delay difference to the base station through signaling interaction.

At S1440, the terminal device generates a reference SRS and sends the reference SRS to the base station through the beam that receives the downlink positioning reference signal.

At S1450, the reference SRS is received through the beam that transmits the downlink positioning reference signal.

At S1460, the reference path is determined based on the reference SRS.

At S1470, the uplink transmission delay of the LOS path is calculated based on the reference delay difference and the uplink transmission delay of the reference path.

Figure 15:
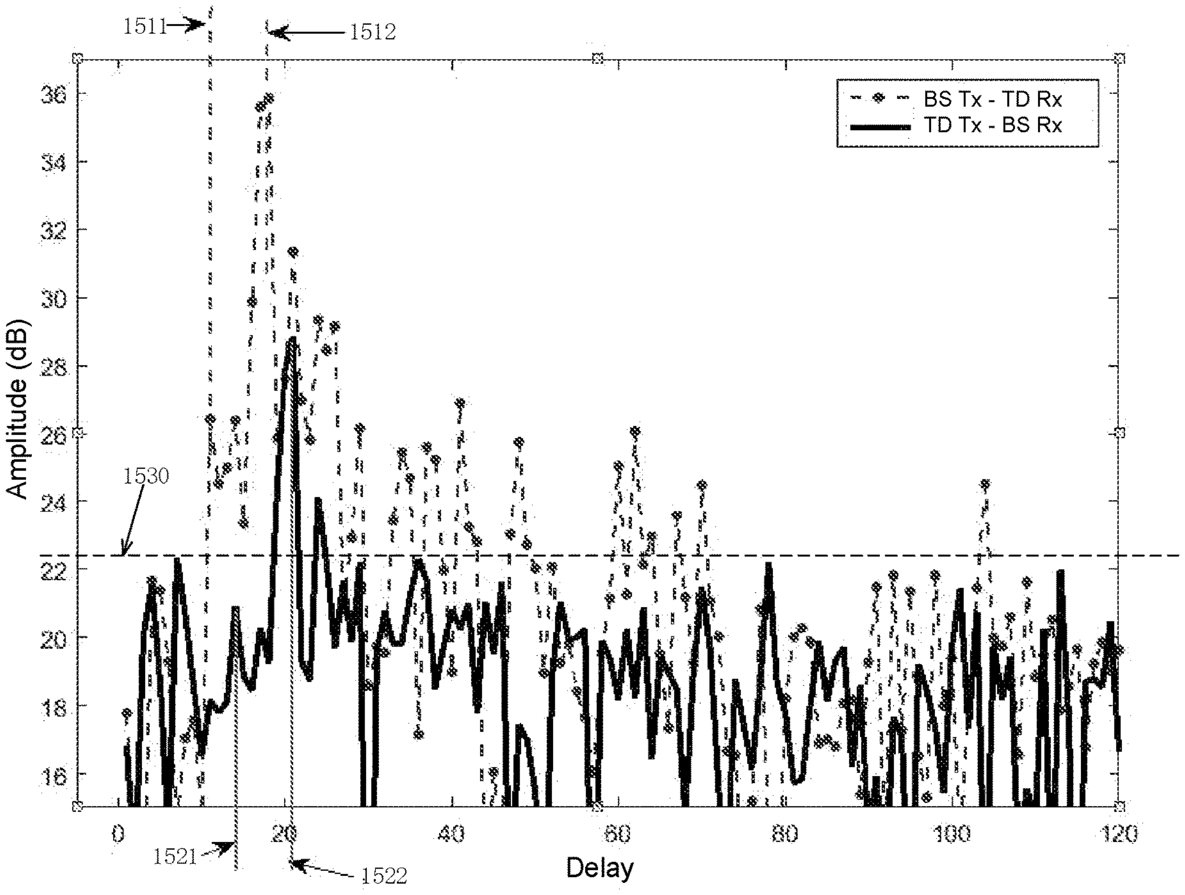
FIG. 15 depicts a spectrum diagram of example embodiment 2 shown in FIG. 14.
Figure 16:
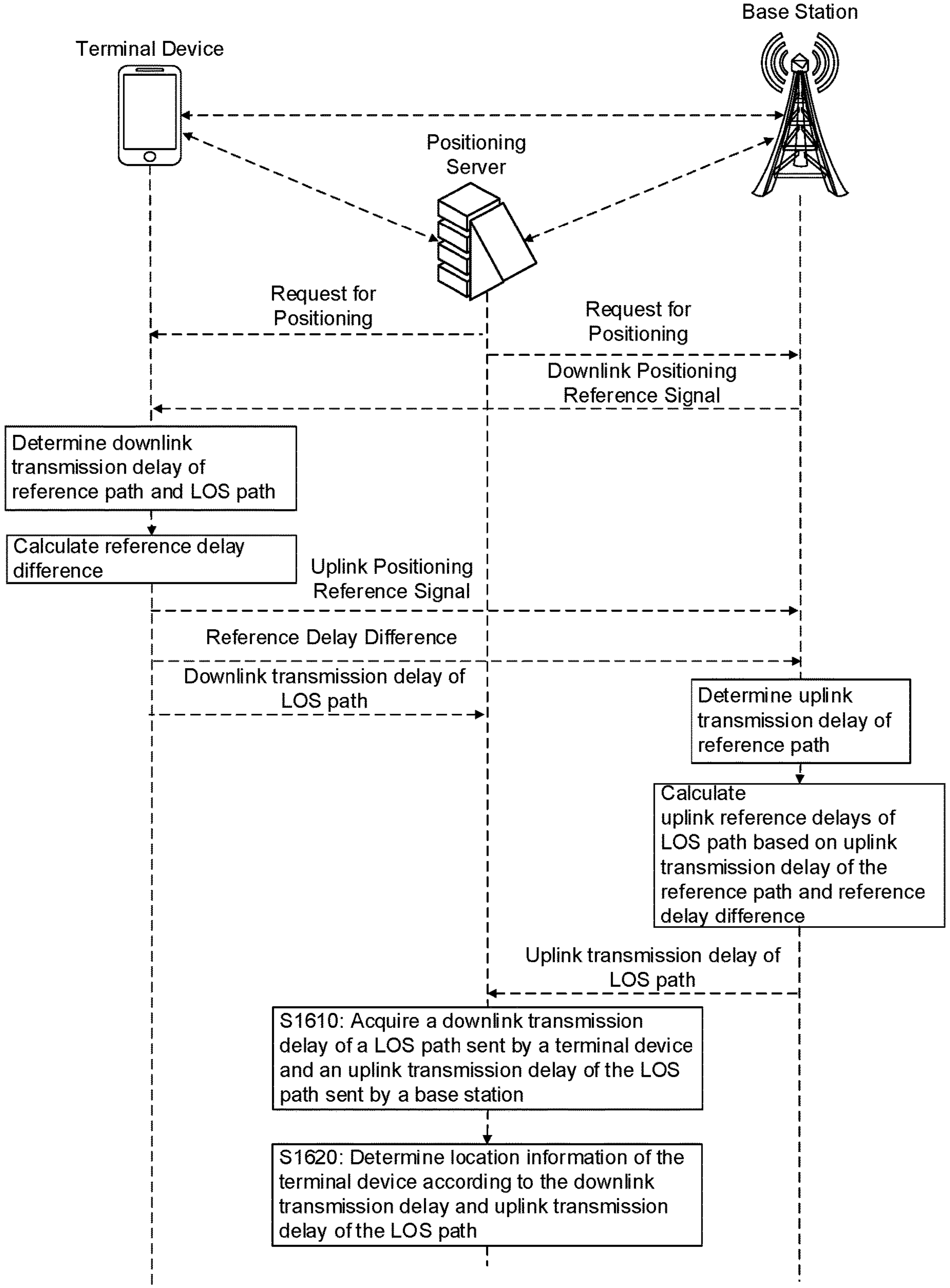
FIG. 16 depicts a flowchart showing a method for positioning according to yet another embodiment of the present disclosure.

FIG. 15 depicts a spectrum diagram obtained according to the embodiment shown in FIG. 14. In FIG. 15, the signal at the lower side of the noise floor reference line 1530 is the noise floor, i.e., the waveform formed by noise and interference in the transmission path. Since the transmission power of the base station is sufficient, it can be determined in the spectrum received by the terminal device that the first detected signal is the downlink positioning reference signal transmitted through the LOS path, i.e., the first peak 1511 shown in FIG. 15. The signal transmission path corresponding to the first peak 1511 can be considered as the LOS path, and the point with the largest signal power is the second peak 1512, so the signal transmission path corresponding to the second peak 1512 is the reference path.

It is worth noting that, for the reference SRS that is sent by the terminal device to the base station, the first peak 1511 is generated before the second peak 1512. Since both the transmitting end and the receiving end employ identical beam, it can be considered that the transmission signal sent through the LOS path received at the base station side should also be prior to the transmission signal sent through the reference path. As can be seen from FIG. 15, for the reference SRS, the point with the strongest signal power is the fourth peak 1522, and the third peak 1521 to the left of the fourth peak 1522 is at the lower side of the noise floor reference line 1530, that is, the transmission signal of the LOS path has been submerged by noise. Therefore, the fourth peak 1522 is easy to detect in the frequency spectrum. Therefore, the uplink transmission delay of the reference path can be obtained, and then the uplink transmission delay of the LOS path can be calculated in combination with the reference delay difference obtained through signaling interaction which reduces the resource overhead in the RTT measurement.

An embodiment of the present disclosure provides a method for positioning, which is applied to a positioning server that is respectively in communicative connection with a base station and a terminal device. The method includes but is not limited to operations S1610 and S1620.

At S1610, a downlink transmission delay of a LOS path sent by a terminal device and an uplink transmission delay of the LOS path sent by a base station are acquired, where the uplink transmission delay of the LOS path is obtained from the method for measuring transmission delay according to the embodiment shown in FIG. 1 or FIG. 7.

At S1620, the location information of the terminal device is determined based on the downlink transmission delay and uplink transmission delay of the LOS path.

It should be noted that the uplink transmission delay of the LOS path can refer to the method of the embodiment shown in FIG. 1 or FIG. 8, and will not be described here for simplicity.

It should be noted that the request for positioning may be initiated by the positioning server, the terminal device, or the base station, which is not limited in this embodiment. After the request for positioning is generated, the terminal device and the base station report the transmission delay of the LOS path to the positioning server respectively. Since the method of the embodiment shown in FIG. 1 or FIG. 8 is adopted to measure the transmission delay, not only can the resource overhead be reduced, but also the measurement efficiency of the uplink transmission delay of the LOS path can be effectively improved since only SRS over at most two symbols is needed, and the wait for receiving and sending multiple SRS are eliminated, thus realizing rapid positioning.

It can be understood that after the positioning server receives the downlink transmission delay and uplink transmission delay of the LOS path, the location information of the terminal device can be determined in any way, such as the RTT measurement method specified in the relevant standards, and this embodiment does not limit this.

Figure 17:
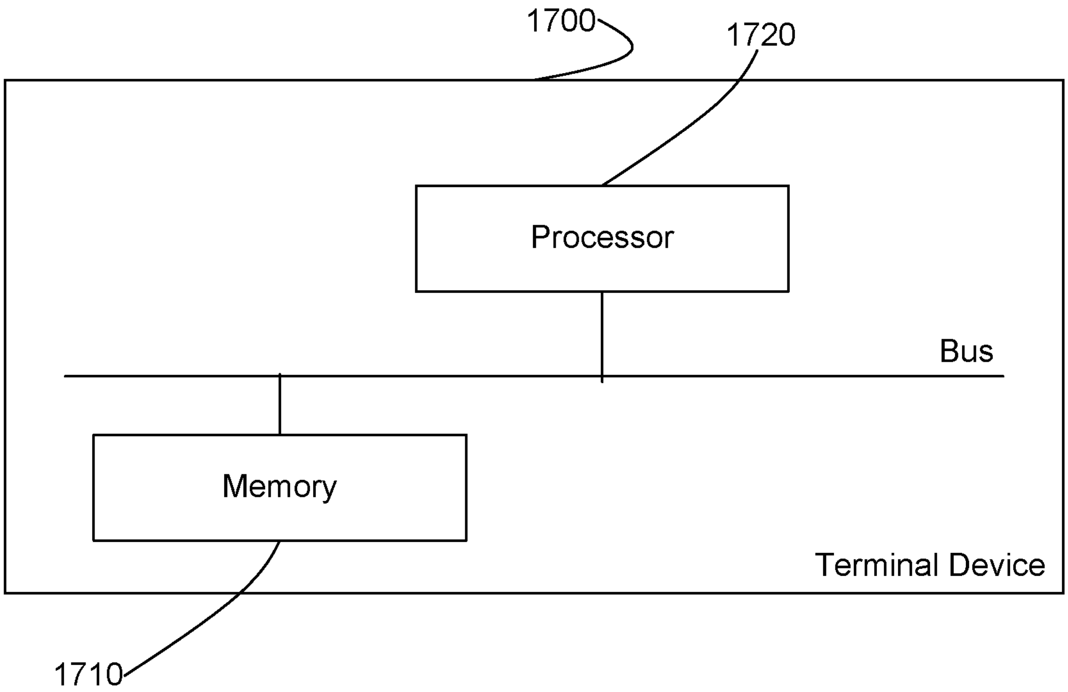
FIG. 17 depicts a schematic diagram showing a terminal device according to yet another embodiment of the present disclosure.

Referring to FIG. 17, an embodiment of the present disclosure provides a terminal device, which includes a memory 1710, a processor 1720 and a computer program stored in the memory 1710 and executable by the processor 1720.

The processor 1720 and the memory 1710 may be connected by a bus or other means.

Non-transitory software programs and instructions of the method described in the above embodiments are stored in a memory 1710 which, when executed by a processor 1720, cause the processor 1720 to carry out operations of the method described above, for example, the above-described operations S110 to S140 described in conjunction with FIG. 1, S210 to S220 described in conjunction with FIG. 2, S310 to S320 described in conjunction with FIG. 3, S410 to S420 described in conjunction with FIG. 4, S510-S520 described in conjunction with FIG. 5, or S610 to S620 described in conjunction with FIG. 6.

Figure 18:
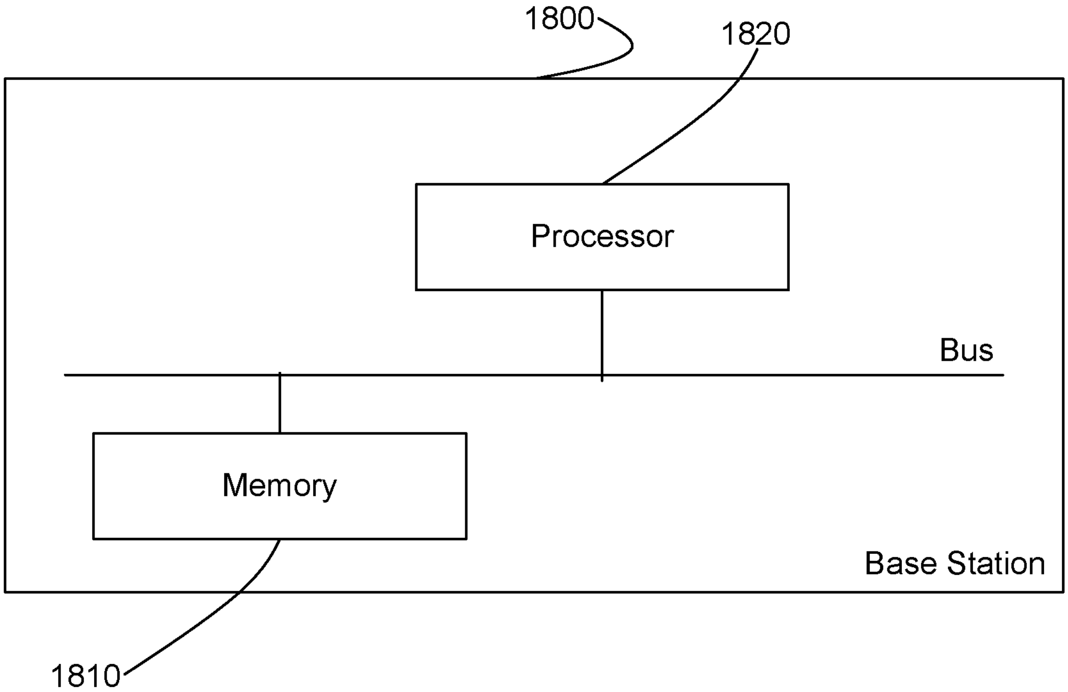
FIG. 18 depicts a schematic diagram showing a base station according to yet another embodiment of the present disclosure.

Referring to FIG. 18, an embodiment of the present disclosure provides a base station 1800, which includes a memory 1810, a processor 1820 and a computer program stored in the memory 1810 and executable by the processor 1820.

The processor 1820 and the memory 1810 may be connected by a bus or other means.

Non-transitory software programs and instructions for the method for measuring transmission delay of any one of the above embodiments are stored in a memory 1810 which, when executed by a processor 1820, cause the processor 1820 to carry out the method described in any one of the above embodiments, for example, the operations S710 to S730 described in conjunction with FIG. 7, S810 to S820 described in conjunction with FIG. 8, S910 to S920 described in conjunction with FIG. 9, S1010 to S1020 described in conjunction with FIG. 10, or S1110 described in conjunction with FIG. 11.

The above-described device embodiments are only illustrative, in which the units illustrated as separate components may or may not be physically separated, that is, they may be located in one place or distributed over several network units. Some or all of the modules can be selected according to the practical requirements to achieve the purpose of this embodiment.

An embodiment of the present disclosure provides a computer-readable storage medium, which stores computer-executable instructions which, when executed by processor or a controller, for example, by a processor in the embodiment concerning the terminal device, causes the processor to carry out the operations of the method for measuring transmission delay applied to the terminal device described above, for example, the above-described operations S110 to S140 described in conjunction with FIG. 1, S210 to S220 described in conjunction with FIG. 2, S310 to S320 described in conjunction with FIG. 3, S410 to S420 described in conjunction with FIG. 4, S510 to S520 described in conjunction with FIG. 5, S610 to S620 described in conjunction with FIG. 6. Alternatively, the computer-executable instructions which, when executed by processor or a controller, for example, by a processor in the embodiment concerning the base station, causes the processor to carry out the operations of the method for measuring transmission delay applied to the base station described above, for example, S710 to S730 described in conjunction with FIG. 7, S810 to S820 described in conjunction with FIG. 8, S910 to S920 described in conjunction with FIG. 9, S1010 to S1020 described in conjunction with FIG. 10, or S1110 described in conjunction with FIG. 11. It shall be appreciated by a person having ordinary skills in the art that all or some of the steps and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

The method according to an embodiment of the present disclosure includes, acquiring a downlink reference signal sent by a base station, and determining a line of sight (LOS) path and a reference path from a plurality of transmission paths of the downlink reference signal; acquiring a reference delay difference that is a difference between a downlink transmission delay of the LOS path and the downlink transmission delay of the reference path; sending an uplink reference signal to the base station, to cause the base station to obtain an uplink transmission delay of the reference path based on the uplink reference signal; and reporting the reference delay difference to the base station, to cause the base station to obtain the uplink transmission delay of the LOS path based on the uplink transmission delay of the reference path and the reference delay difference. According to the scheme set forth in an embodiment of the present disclosure, the base station is enabled to obtain the uplink transmission delay of the reference path through one uplink reference signal, under the condition of the limited uplink power of the terminal device, and the uplink transmission delay of the LOS path is calculated through the uplink transmission delay of the reference path in conjunction with the reference delay difference, thus effectively reducing the resource overhead for measuring the uplink transmission delay of the LOS path.

Described above is a description for several embodiments of the present disclosure, but the present disclosure is not limited to the above embodiments. Those having ordinary skills in the art can make various equivalent modifications or substitutions without departing the scope of the present disclosure, and these equivalent modifications or substitutions are within the scope defined by the claims of the present disclosure.

What is claimed is:

1. A method for measuring transmission delay, applied to a terminal device, the method comprising,
- acquiring a downlink reference signal sent by a base station, and determining a line of sight (LOS) path and a reference path from a plurality of transmission paths of the downlink reference signal;
- acquiring a reference delay difference that is a difference between a downlink transmission delay of the LOS path and a downlink transmission delay of the reference path;
- generating a reference sounding reference signal (SRS);
- sending the reference SRS to the base station, to cause the base station to determine the reference path from several transmission paths of the reference SRS; and
- reporting the reference delay difference to the base station, to cause the base station to obtain an uplink transmission delay of the LOS path based on the uplink transmission delay of the reference path and the reference delay difference.

2. The method as claimed in claim 1, wherein determining the LOS path and the reference path from the plurality of transmission paths of the downlink reference signal comprises,
- determining the transmission path that earliest completes a transmission of the downlink reference signal as the LOS path; and
- determining a signal reception power of the transmission path of the downlink reference signal, and determining the reference path based on the signal reception power, wherein the signal reception power of the reference path is greater than or equal to the signal reception power of the LOS path.

3. The method as claimed in claim 1, wherein reporting the reference delay difference to the base station to cause the base station to obtain the uplink transmission delay of the LOS path based on the uplink transmission delay of the reference path and the reference delay difference comprises,
- generating a new reference SRS, and modulating the new reference SRS based on the reference delay difference to obtain a modulated SRS; and
- sending the modulated SRS to the base station, to cause the base station to obtain the reference delay difference based on the modulated SRS and the reference SRS, and to obtain the uplink transmission delay of the LOS path based on the uplink transmission delay of the reference path, and the reference delay difference.

4. The method as claimed in claim 1, wherein before reporting the measurement parameter difference to the base station, the method further comprises, determining a receiving beam for the downlink reference signal; and determining the receiving beam as a transmitting beam for transmitting the reference SRS.

5. The method as claimed in claim 1, wherein reporting the reference delay difference to the base station comprises, generating a communication signaling carrying the reference delay difference; and sending the communication signaling to the base station.

6. A method for positioning, applied to a positioning server in communicatively connection with a base station and a terminal device respectively, the method comprising, acquiring a downlink transmission delay of a line of sight (LOS) path sent by the terminal device and an uplink transmission delay of the LOS path sent by the base station, wherein the uplink transmission delay of the LOS path is obtained according to the method as claimed in claim 1; and determining location information of the terminal device based on the downlink transmission delay and the uplink transmission delay of the LOS path.

7. A terminal device, comprising a memory, a processor and a computer program stored in the memory and executable by the processor which, when executed by the processor causes the processor to carry out the method as claimed in claim 1.

8. A non-transitory computer-readable storage medium storing a computer-executable instruction which, when executed by a processor causes the processor to carry out the method as claimed in claim 1.

9. The method as claimed in claim 1, wherein reporting the reference delay difference to the base station comprises, generating a communication signaling carrying the reference delay difference; and sending the communication signaling to the base station.

10. A method for measuring transmission delay, applied to a base station, the method comprising, sending a downlink reference signal to a terminal device, to cause the terminal device to determine a line of sight (LOS) path and a reference path from a plurality of transmission paths of the downlink reference signal;

acquiring a reference sounding reference signal (SRS) sent by the terminal device;

determining the reference path from several transmission paths of the reference SRS; and acquiring a reference delay difference reported by the terminal device, and acquiring an uplink transmission delay of the LOS path based on the uplink transmission delay of the reference path and the reference delay difference, wherein the reference delay difference is a difference between a downlink transmission delay of the LOS path and a downlink transmission delay of the reference path.

11. The method as claimed in claim 10, wherein acquiring the reference delay difference reported by the terminal device comprises, acquiring a modulated SRS and a reference SRS sent by the terminal device, wherein the modulated SRS is obtained from modulating a new reference SRS generated by the terminal device based on the reference delay difference; and acquiring the reference delay difference based on the modulated SRS and the reference SRS.

12. The method as claimed in claim 10, wherein before acquiring the reference SRS sent by the terminal device, the method further comprises, determining a transmitting beam for transmitting the downlink reference signal; and determining the transmitting beam as a receiving beam for receiving the reference SRS.

13. The method as claimed in claim 10, wherein acquiring the reference delay difference reported by the terminal device comprises, acquiring a communication signaling sent by the terminal device, wherein the communication signaling carries the reference delay difference.

14. The method as claimed in claim 10, wherein acquiring the reference delay difference reported by the terminal device comprises, acquiring a communication signaling sent by the terminal device, wherein the communication signaling carries the reference delay difference.

15. A method for positioning, applied to a positioning server in communicatively connection with a base station and a terminal device respectively, the method comprising, acquiring a downlink transmission delay of a line of sight (LOS) path sent by the terminal device and an uplink transmission delay of the LOS path sent by the base station, wherein the uplink transmission delay of the LOS path is obtained according to the method as claimed in claim 7; and determining location information of the terminal device based on the downlink transmission delay and the uplink transmission delay of the LOS path.

16. A non-transitory computer-readable storage medium storing a computer-executable instruction which, when executed by a processor causes the processor to carry out the method as claimed in claim 10.

17. A base station, comprising a memory, a processor and a computer program stored in the memory and executable by the processor which, when executed by the processor causes the processor to carry out the method as claimed in claim 10.

* * * * *